(12) United States Patent
Nassimi

(10) Patent No.: US 6,980,630 B1
(45) Date of Patent: Dec. 27, 2005

(54) SELF CONTAINED VOICE AND INTERNET DEVICE WITH TELEPHONE KEYPAD CONTROLS

(76) Inventor: Shary Nassimi, 2002 NW. 215 Cir., Ridgefield, WA (US) 98642

( * ) Notice: Subject to any disclaimer, the term of this patent is extended or adjusted under 35 U.S.C. 154(b) by 129 days.

(21) Appl. No.: 10/401,163

(22) Filed: Mar. 27, 2003

(51) Int. Cl.$^7$ .............................................. H04M 11/00
(52) U.S. Cl. ................................. 379/93.11; 379/93.05
(58) Field of Search ........................ 379/93.11, 93.09, 379/93.05, 93.06, 93.07, 93.35, 142.01, 142.04, 379/142.06, 142.15, 90.01, 102.01–102.07; 709/227, 228, 237

(56) References Cited

U.S. PATENT DOCUMENTS

| | | | | |
|---|---|---|---|---|
| 5,056,132 A | * | 10/1991 | Coleman et al. | 379/93.11 |
| 5,062,133 A | * | 10/1991 | Melrose | 379/93.11 |
| 6,317,488 B1 | * | 11/2001 | DePond et al. | 379/93.35 |
| 6,377,668 B1 | * | 4/2002 | Smock et al. | 379/142.08 |
| 6,594,350 B2 | * | 7/2003 | Tang | 379/93.34 |
| 6,731,726 B1 | * | 5/2004 | Kerner et al. | 379/93.35 |
| 6,768,791 B1 | * | 7/2004 | Olafsson et al. | 379/93.32 |

\* cited by examiner

Primary Examiner—Wing Chan
(74) Attorney, Agent, or Firm—George R. McGuire; Bond, Schoeneck & King, PLLC

(57) ABSTRACT

The present invention teaches the use of a telephone keypad to control operations of an internet/telephone call switching device. Using the present invention, a user can switch from modem usage of a telephone line to receipt of an incoming call, and can switch back to the Internet Service Provider (ISP) with minimum difficulty when the call is terminated. Uniquely, set-up, programming and operations of the present device may be controlled by means of DTMF tones received from the telephone keypad. Operations may be remote, local, the DTMF decoder may be external or internal to the device, codes may be stand alone or only operant in a "command mode", the device may use DSP, fuzzy logic, look-up tables or other means to decode the DTMF signals. The command code filter may be implemented as hardware or as software. One command code may be a security code preventing unauthorized access and control of the device's operations, set-up, programming or usage.

16 Claims, 23 Drawing Sheets

METHOD FOR ASCERTAINING THAT CALL WAITING IS NOT DISABLED FOR MAC USERS

METHOD OF MAKING THE SELF-CONTAINED DEVICE (10) WORK BETTER WITH THE COMPUTER (18) IF THE COMPUTER (18) DISCONNECTS AS SOON AS THE TELEPHONE/ANSWERING MACHINE (14) RINGS OR AS SOON AS THE TELEPHONE/ANSWERING MACHINE (14) IS ANSWERED

SELF CONTAINED VOICE AND INTERNET DEVICE WITH TELEPHONE KEYPAD CONTROLS

FIELD OF THE INVENTION

This invention relates generally to telephony devices and specifically to telephony devices allowing use of a single telephone line for voice and internet use.

BACKGROUND OF THE INVENTION

Applicant has carried out multiple searches in the US Patent Office Database for references relating to this invention. Two groups of references are cited below. The first group of eleven patents has been previously disclosed to the patent office, while the second group is based upon the latest searches.

Applicant has previously disclosed the following references. Even though these innovations may be suitable for the specific individual purposes to which they address, however, they differ from the present invention.

U.S. Pat. No. 4,639,553 to Kiguchi teaches a facsimile communication system wherein a call signal detecting device is for identifying call signals which are received over a network. Both an unsounding call signal and a sounding call signal are detected by a single detection circuitry, which is also responsive to off-hooking of an own station's telephone set. Detection of such signals is implemented by the measurement of a period which is performed by a processing unit, so that changes in the specifications of the signals to be detected can be accommodated merely by modifying a program of the processing system and not the hardware of the device.

U.S. Pat. No. 4,856,049 to Streck teaches apparatus for answering an incoming call over a single telephone line and for automatically switching the call between a telephone and a carrier signal-based device as appropriate. There is a three position switch for switching a telephone line connected thereto between first, second and third output positions thereof. The switch has the telephone operably connected to the second output position thereof and the carrier signal-based device connected to the third output position thereof. There is first logic having an input connected to the first output position of the switch and an output operably connected to switch the switch between the first, second and third output positions for answering an incoming call on the telephone line, for determining whether the incoming call is from a carrier signal-based device, for switching the switch to connect the second output position when an incoming call from a non-carrier signal-based device is detected, and for switching the switch to connect the third output position when an incoming call from a carrier signal-based device is detected. There is also second logic having an input connected to sense transmissions from the telephone and the carrier signal-based device and an output operably connected to switch the switch between the first, second and third output positions for switching the switch to the first position when a hang up by the telephone or the carrier signal-based device is detected. The preferred embodiment also senses a pickup by either device and automatically switches the switch to connect the device to the telephone line for outgoing transmission use. The preferred stand alone version also includes telephone answering capability for alerting a caller to its operation and for recording a message if the telephone is not answered.

U.S. Pat. No. 5,003,581 to Pittard teaches a control and switching unit used with at least two devices for transmitting information or voice communication over telephone lines. The control and switching unit is provided with a series of relay to ensure that only one of the devices receives or transmits information at any one time. A timing circuit is utilized such that if one of the devices is a telephone, the second device would not be able to gain access to the telephone line if the telephone is ringing. Additionally, if the telephone is in use, the secondary device, such as a modem, could be selected and this secondary device would gain access to the telephone line after the use of the telephone has been discontinued.

U.S. Pat. No. 5,036,534 to Gural teaches a subscriber's interface enabling the connection of otherwise incompatible telephone device systems (hereinafter "(Z)") to a single telephone line, each telephone device system having devices such as: a computer modem (hereinafter "(F)"), an automatic answering machine (hereinafter "(A)"), and telephone sets (hereinafter "(T)"). When a ring signal is received from the central office, the interface allows a first device, such as (A) or (T) to answer the call, and monitors the communication between the calling party and the first device bearing in mind its various operating modes. Based on the monitored conversation, the interface determines if the call should be connected to a second device. If so, an actuating signal is sent to (F), whereupon when (F) becomes OFF HOOK, it is connected to the telephone line. If the first device is an automatic answering machine, its various operating modes include: outgoing message, incoming message, beeperless remote mode. If the first device is a remotely located telephone set, its various mode of operation include simple human voice signals and complex human voice signals.

U.S. Pat. No. 5,392,334 to O'Mahoney teaches a method for processing an incoming call on a telephone line in a computer system, wherein a telephony circuit detects a pick-up by a parallel device coupled to the telephone line while maintaining high voltage isolation. The telephony circuit performs hard line seizures to cause the parallel device to hang-up and soft line seizures to prevent a central office hang up after the parallel device hangs up.

U.S. Pat. No. 5,519,767 to O'Horo et al. teaches a call-waiting feature that is supported on voice-and-data modems by causing voice-and-data modems to go into voice-only mode upon receipt of the modem clear-down signal. A first voice-and-data modem engaged in an initial voice-and-data call with a second voice-and-data modem responds to receipt of a call-waiting signal by generating a replica of the call-waiting signal on the user's audio channel. The first modem responds to a user request to pick up the waiting call by sending the modem clear-down signal to the second voice-and-data modem, going into voice-only mode, and transmitting a waiting-call acceptance signal. The initial call that is placed on hold is thus a voice-only call. While in a voice-plus-data picked-up waiting call, the first modem responds to a user request to reinstate the initial call by again sending the modem clear-down signal, going into voice-only mode, and transmitting a call-resumption signal. The first modem is thus in voice-only-mode when it is reconnected to the initial, voice-only, call. The reconnected initial call may now be reconverted into a voice-plus-data call in the convention manner.

U.S. Pat. No. 5,809,128 to McMullin teaches methods and apparatus for providing automatic redirection of an incoming voice telephone call from a caller to a subscriber proxy when an attempt by the caller to connect to a telephone link of a public switched telephone network (PSTN) is blocked due to the telephone link being occupied by a subscriber using the telephone link to establish communication between the subscriber's personal computer and a computer network. The subscriber proxy is connected to both the PSTN and the computer network, and produces audio interaction with the caller. The subscriber proxy also notifies the subscriber of the incoming call via the subscriber's computer. The subscriber's computer can optionally be used by the subscriber to control and interact with the incoming call by communicating with the computer proxy while the subscriber continues to occupy the telephone link.

U.S. Pat. No. 6,005,924 to Krexner et al. teaches a fax and phone combination device. The combination device is coupled to an external phone. From a phone line, the combination device receives a call signal, a fax signal, and an information signal. The call signal precedes the fax signal and the information signal. The combination device comprises a fax, an internal phone, and a call signal processor. The call processor processes the call signal received by the combination device and produces a first ringing signal from the call signal. The first ringing signal is intended for the internal phone. The combination device further comprises a ringing signal generator for generating a second ringing signal that is intended for the external phone, and a switch coupled to the fax, the internal phone, and the call processor. A call pulse in the call signal causes the switch to switch the combination device in a simulated receiving mode. In the simulated receiving mode, the fax signal detector detects whether the fax signal is present. If the fax signal is present, the fax signal is routed to the fax. If no fax signal is present, the second ringing signal is routed to the external phone.

U.S. Pat. No. 6,067,353 to Szeliga teaches a method and related apparatus for detecting the presence of a call waiting signal on a telephone line, where the call waiting signal is embedded in various signals. The call waiting signal frequency is isolated from the various other frequencies. The isolated call waiting frequency is then biased so that only the positive voltage portions of the signal are allowed to pass. Each positive voltage pulse as well as the zero voltage pulses are then sampled to determine whether they are representative of a biased call waiting signal. Each time a determination is made, one is added to a count on an up-down counter. When the count reaches a predetermined number, a call waiting signal is detected on the telephone line. Preferably an alarm signals the presence of a detected call waiting signal to the user. A disconnect switch interrupts a modem so that a person using the modem on the same telephone line will have sufficient time to answer a detected incoming call.

U.S. Pat. No. 6,259,353 to Berger et al. teaches a transponder communication device that interrogates an operational test transponder that is permanently within a receiving range of the transponder communication device. In response thereto, the operational test transponder sends operational test information to the transponder communication device. The transponder communication device checks whether received operational test information is valid, and generates an error signal if the received operational test information is invalid.

U.S. Pat. No. 6,259,692 to Shtivelman et al. teaches a telephony call-waiting system for clients having a computer with a video display unit (PC/VDU) and a public-switched telephony network (PSTN) telephone connected to the PSTN by a single line, keeps a status indication of the client's Internet connection status and, during periods of time the PC/VDU is connected to the Internet, alerts the client by an alert signal over the Internet connection of any waiting PSTN calls. In a preferred embodiment the client's PC/VDU is adapted to provide an audio and/or visual alert event when an alert signal is received, and to provide for a user-initiated response to an alert, accepting or rejecting a call. In the event a call is accepted, provision is made for connecting the accepted call to the client's PC/VDU as an IP call. In some embodiments several calls may be dealt with at the PC/VDU, and features are provided such as caller-ID on the client's VDU. Several ways of accomplishing the call-waiting system are taught.

Even though previous innovations may be suitable for the specific individual purposes to which they are addressed they would not be suitable for the purposes of the present invention as hereinafter described.

The second group of references below are based upon more recent patentability searches.

U.S. Pat. No. 5,550,908 issued Aug. 27, 1996 to Cai et al for MODEM COMMUNICATIONS INTEROPERABILITY WITH SERVICES EQUIPPED TO PROVIDE CALLING PARTY IDENTITY DELIVERY WITH CALL WAITING teaches that a modem may be equipped to recognize an "alerting" signal, and re-establish communications as desired, even with a second modem not so equipped. It teaches the use of a keypad on the telephonic device of the patent and thus separate from the keypad on a telephone on the same circuit.

U.S. Pat. No. 5,841,850 issued Nov. 24, 1998 to Fan for INTELLIGENT CALLER IDENTIFICATION APPARATUS FOR NOTIFYING A SELECTED TELEPHONE NUMBER OF THE ARRIVAL OF SPECIAL INFORMATION teaches a device once again incorporating a keypad 18 (see FIG. 1 of the '850 patent) into the device and thus entirely separate from a telephone 31.

U.S. Pat. No. 5,940,485 issued Aug. 17, 1999 to Sapra et al for DATA INTERFACE CONNECTED IN LINE BETWEEN A KEYBOARD AND A KEYBOARD PORT OF A PERSONAL COMPUTER teaches an interesting but unrelated technique in which a Caller ID device is plugged into a keyboard port on a personal computer, and the keyboard is plugged into the device. By this means, Caller ID information may reach the PC via the keyboard port, with consequent advantages. However, the device does not implicate use of a telephone keypad.

U.S. Pat. No. 5,982,774 issued Nov. 9, 1999 to Foldare et al for INTERNET ON HOLD teaches a method based upon the telephone switching network rather than a client side home or office device. It implicates use of a computer screen and commands for network control, not control via the telephone keypad.

U.S. Pat. No. 6,038,443 issued Mar. 14, 2000 to Luneau for CALLING PART ANNOUNCEMENT APPARATUS teaches an apparatus to provide the identity of a caller, the apparatus having a four button keypad 56 (see FIG. 1 of the '443 patent) separate from any associated telephones 14.

U.S. Pat. No. 6,339,643 issued Jan. 15, 2002 to Mastrocola et al for TELEPHONE DISABLE FEATURE teaches a "disabling button" 26 located on the telephone itself for disabling part or all of the controls of the telephone itself. This device is far outside the technology relevant to the present invention.

U.S. Pat. No. 6,377,668 issued Apr. 23, 2002 to Smock et al for INTERNET PRIORITY CALL DEVICE teaches a device for switching from a modem call to an ISP to a telephone audio call. It does not reveal the use of any keypad to control the device, much less the use of a telephone keypad for that purpose.

It will be appreciated that none of these devices teach that a telephone keypad may be used to control operations of an internet/telephone call switching device.

SUMMARY OF THE INVENTION

General Summary

The present invention teaches the use of a telephone keypad to control operations of an internet/telephone call switching device.

Using the present invention, a user can switch from modem usage of a telephone line to receipt of an incoming call, and can switch back to the Internet Service Provider (ISP) with minimum difficulty when the call is terminated. Uniquely, set-up, programming and operations of the present device may be controlled by means of DTMF tones received from the telephone keypad. Operations may be remote, local, the DTMF decoder may be external or internal to the device, codes may be stand alone or only operant in a "command mode", the device may use DSP, fuzzy logic, look-up tables or other means to decode the DTMF signals. The command code filter may be implemented as hardware or as software. One command code may be a security code preventing unauthorized access and control of the device's operations, set-up, programming or usage.

Summary in Reference to Claims

It is therefore one aspect, advantage, embodiment and objective of the present invention to provide a self-contained device for using a single telephone line to receive telephone calls while being simultaneously connectable to the Internet by a computer having a modem, said device comprising: a single housing having a wall and a microprocessor; a telephone/answering machine jack located on the wall of the single housing; a modem jack located on the wall of the single housing; a telephone line jack located on the wall of the single housing; a command code filter able to identify DTMF command codes, the command code filter operatively connected to the microprocessor.

It is therefore one aspect, advantage, embodiment and objective of the present invention to provide a device wherein the DTMF command codes are generated by a telephone operatively connected to the device, the telephone having a keypad and a DTMF tone generator.

It is therefore yet another aspect, advantage, embodiment and objective of the present invention to provide a device wherein the DTMF command codes are generated by a telephone operatively connected to the device by a physical connection to the telephone line jack, the telephone having a keypad and a DTMF tone generator.

It is therefore yet another aspect, advantage, embodiment and objective of the present invention to provide a device wherein the DTMF command codes are generated by a telephone operatively connected to the device via a telephone switching system, the telephone having a keypad and a DTMF tone generator.

It is therefore yet another aspect, advantage, embodiment and objective of the present invention to provide a device wherein the microprocessor is able to respond to receipt of DTMF command codes from the command code filter.

It is therefore yet another aspect, advantage, embodiment and objective of the present invention to provide a device wherein receipt of a DTMF command code causes the microprocessor to alter one member selected from the group consisting of: operation of the switching device, set-up of the switching device, programming of the switching device, and combinations thereof.

It is therefore yet another aspect, advantage, embodiment and objective of the present invention to provide a device wherein the sensitivity of the device to receipt of such telephone calls may be adjusted by means of a DTMF command code.

It is therefore yet another aspect, advantage, embodiment and objective of the present invention to provide a device wherein the command code filter is a software device.

It is therefore yet another aspect, advantage, embodiment and objective of the present invention to provide a device wherein the command code filter is implemented in the microprocessor.

It is therefore yet another aspect, advantage, embodiment and objective of the present invention to provide a device wherein the command code filter is a hardware device.

It is therefore yet another aspect, advantage, embodiment and objective of the present invention to provide a device wherein the command code filter utilizes one member selected from the group consisting of: digital signal processing, fuzzy logic, look-up tables, and combinations thereof, in determining what signals are received.

It is therefore yet another aspect, advantage, embodiment and objective of the present invention to provide a device wherein at least one of the command codes comprises a security code.

It is therefore yet another aspect, advantage, embodiment and objective of the present invention to provide a device wherein at least one of the command codes causes the device to enter a command mode in which it responds to later received DTMF codes as command codes, until such time as the device leaves command mode.

It is therefore yet another aspect, advantage, embodiment and objective of the present invention to provide a device of wherein at least one of the command codes operates independently of any other command code.

It is therefore one more aspect, objective, embodiment and advantage of the present invention to provide a device wherein the command code filter is external to the device and operatively connected thereto.

It is therefore yet another aspect, advantage, embodiment and objective of the present invention to provide an improved method of programming a telephone switching device used to receive telephone calls while simultaneously connectable to the Internet by a computer having a modem, the improvement comprising: providing a command code filter able to identify DTMF command codes generated by an external telephone in operative connection with the switching device; using the DTMF command codes to alter one member selected from the group consisting of: operation of the switching device, set-up of the switching device, programming of the switching device, and combinations thereof.

Figure 1:
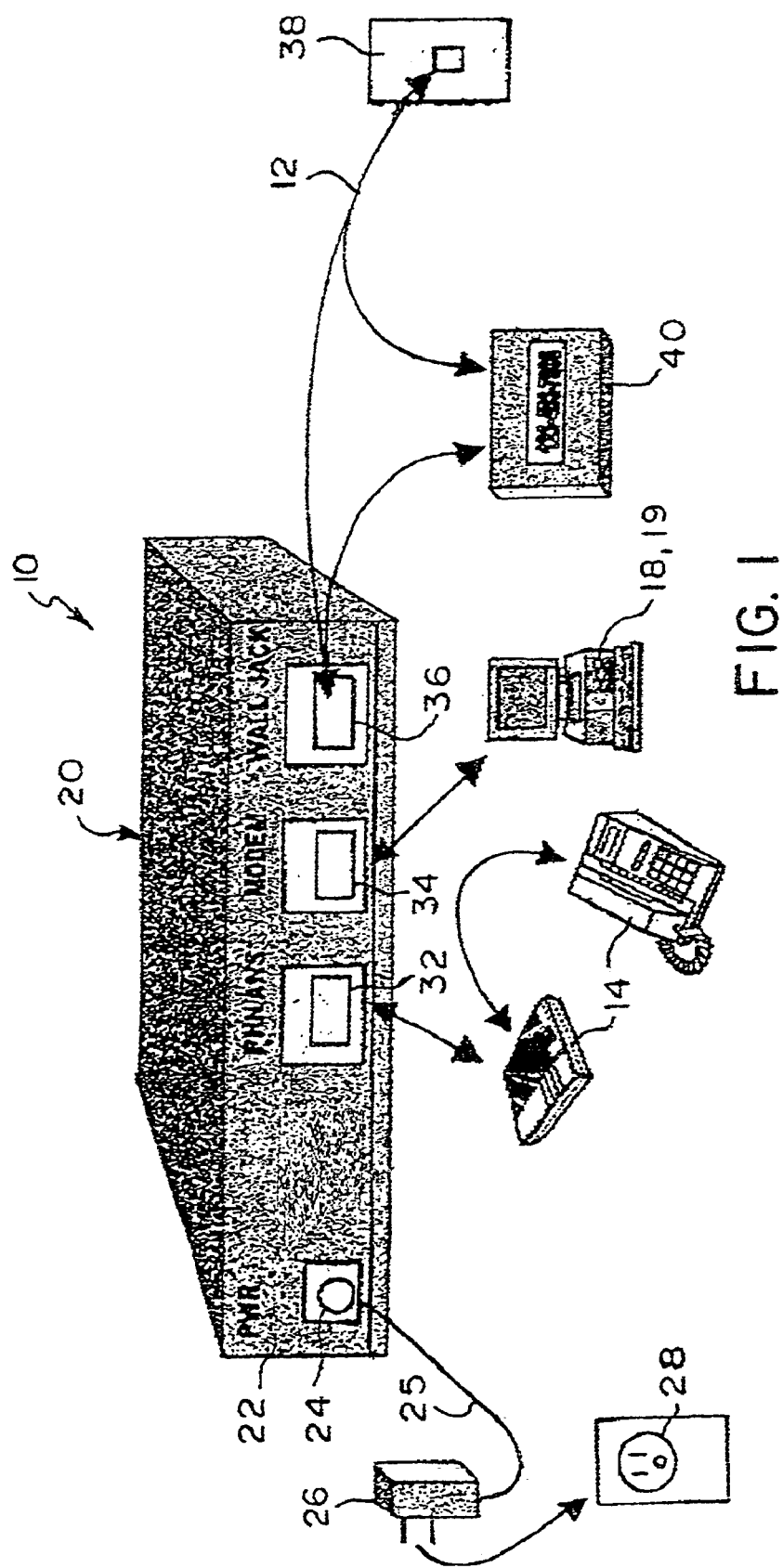
FIG. 1 is a diagrammatic perspective view of the present invention interfacing with associated inputs.

INDEX OF REFERENCE NUMERALS 10 self-contained device of present invention for using single telephone line 12 to receive telephone calls and facsimiles for transmission respectively to a telephone/answering machine 14 and facsimile machine 16 while being simultaneously connectable to the Internet by computer 18
12 single telephone line
14 telephone/answering machine
16 facsimile machine
18 computer
20 single housing
22 back wall of single housing 20
24 power supply input
25 cable
26 AC transformer for connecting to AC power source 28
28 AC power source
30 facsimile jack for connecting to facsimile machine 16
32 telephone/answering machine jack for connecting to telephone/answering machine 14
34 modem jack for connecting to computer 18
36 telephone line jack for connecting to telephone outlet 38
38 telephone outlet
40 caller ID device
41 power supply
42 micro-processor
43 5 volt voltage regulator of power supply 41
44 tone detectors
44a fax tone detector of tone detector 44
44b call waiting tone detector of tone detector 44
44c command code filter of tone detector 44
45 telephone line isolation and input amplification and filtration
46 tone select
48 display and ring buzzer
50 ring voltage generator

DETAILED DESCRIPTION

The present invention makes use of the call waiting signal offered as a feature by many telephone service providers, to allow simultaneous use of the Internet and the call waiting features. For purposes of this patent application, it will be understood that the terms "distinctive ring signal", "distinctive call waiting tone", and the like are used interchangeably herein. In addition, "Internet Service Provider", "ISP", or just "service provider" and the like are used interchangeably herein. In general, when a user is on-line, they will be enabled by the device of the invention to receive distinctive rings/call waiting signals and then decide, either manually or automatically, whether they wish to break off their Internet session or ignore the telephone call.

More specifically, the present invention makes use of the keypad of an attached telephone to provide command codes allowing the device to be programmed, altered or adjusted by the user. By the use of such command codes, the device may be given great flexibility without the additional expense and size of a keypad actually located on and dedicated to the device itself.

Figure 2:
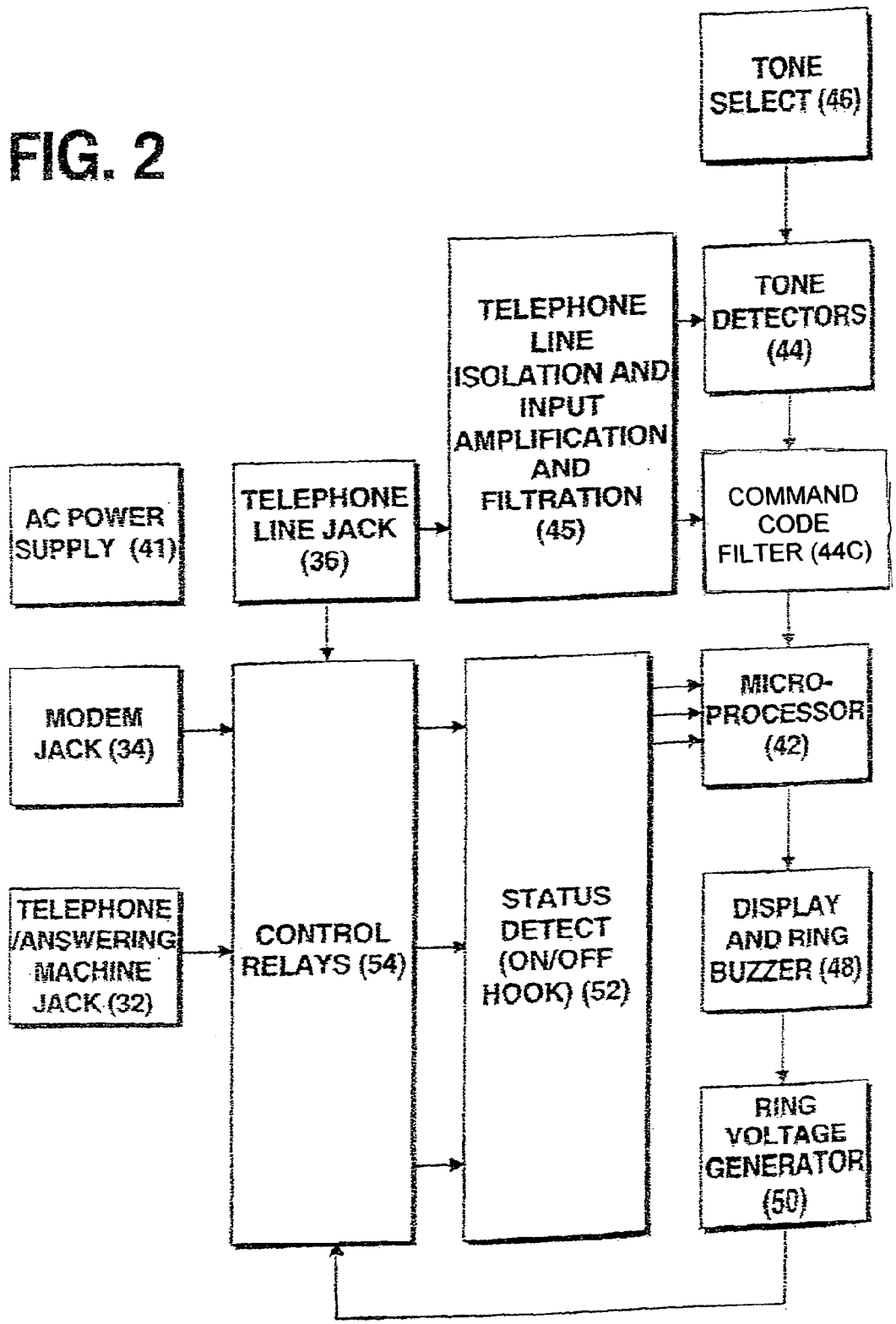
FIG. 2 is a block diagram of the present invention.

Referring now to the Figures, in which like numerals indicate like parts, and particularly to FIGS. 1 and 2, the self-contained device of the present invention is shown generally at 10 for using a single telephone line 12 to receive telephone calls and facsimiles for transmission respectively to a telephone/answering machine 14 having a keypad and a facsimile machine 16 while being simultaneously connectable to the Internet by a computer 18 that has a modem 19.

Telephone 14 has a keypad and a DTMF tone generator attached thereto. Pushing a button on the keypad causes generation of the corresponding DTMF code. In normal usage, this is used to signal to the switching network (the telephone service provider) exactly what number or special service is being dialed. However, in the present invention, DTMF codes are used to signal to the device of the present invention. The signals may adjust the set-up, operation, or programming of the device.

The self-contained device 10 comprises a single housing 20 that has a back wall 22.

The self-contained device 10 further comprises a power supply input 24. The power supply input 24 is on the back wall 22 of the single housing 20 and is connected by a cable 25 to an AC transformer 26 for connecting to an AC power source 28.

The self-contained device 10 further comprises a facsimile jack 30. The facsimile jack 30 is on the back wall 22 of the single housing 20 and is for connecting to the facsimile machine 16.

The self-contained device 10 further comprises a telephone/answering machine jack 32. The telephone/answering machine jack 32 is on the back wall 22 of the single housing 20 and is for connecting to the telephone/answering machine 14.

The self-contained device 10 further comprises a modem jack 34. The modem jack 34 is on the back wall 22 of the single housing 20 and is for connecting to the computer 18.

The self-contained device 10 further comprises a telephone line jack 36. The telephone line jack 36 is on the back wall 22 of the single housing 20 and is for connecting to a telephone outlet 38. If a caller ID device 40 is used, the caller ID device 40 is connected between the telephone line jack 36 and the telephone outlet 38.

The self-contained device 10 further comprises a power supply 41. The power supply 41 is contained in the single housing 20 and communicates with the power supply input 24. The power supply 41 includes a 5 volt voltage regulator 43.

The self-contained device 10 further comprises a micro-processor 42. The micro-processor 42 is contained in the single housing 20 and makes most of the functional decisions. A typical example of the micro-processor 42 is Microchip PIC 16C54.

The self-contained device 10 further comprises in favored embodiments tone detectors 44. The tone detectors 44 are contained in the single housing 20, communicate with the micro-processor 42, and include a fax tone detector 44a and a call waiting tone detector 44b.

The self-contained device 10 further comprises command code filter 44c. Command code filter 44c is contained within the single housing 20 of self-contained device 10, and may be an independent device, a part of micro-processor 42 or a part of tone detectors 20. Filter 44c may also be a software implementation running on micro-processor 42 within self-contained device 10. Such a software implementation may be modified and programmed via download from either a telephone line or from an attached computer, or may be modified and programmed by means of hardware on single housing 20: mode/function buttons, etc. Filter 44c recognizes command codes in DTMF format received by tone detector 44, to which it is operatively connected.

In alternative embodiments, the command code filter is external to the device and operatively connected thereto. This is useful in embodiments in which the basic switching device itself does not have a DTMF decoder. In such embodiments, the filter and decoder are an "add-on" or "accessory" device added to increase the capabilities of the basic switching device. The external device may be in a second housing, may be programmed or hardwired into a computer, etc.

Command codes sent to the device of the present invention may arrive not just from the telephone actually attached to the device itself, but may also come from a remote location, thus allowing remote set-up or operation of the device of the present invention. A user might call in and then utilize the command codes as previously described.

Filter 44c may utilize DSP, digital signal processing, in the preferred embodiment of the invention. One advantage of DSP is that it in turn facilitates the use of pattern recognition algorithms to compensate for dropped out signal. Such pattern recognition may in turn utilize look up tables and/or fuzzy logic. An example of the functionality of fuzzy logic and look up tables, may be a case in which a user has two distinctive rings programmed, the first distinctive ring being a single short ring signal and the second distinctive ring being a long signal followed by a short signal. Should a ring signal be corrupted by the dropping of a portion of the long ring, it will be received as two short signals. Ordinarily, this would be unrecognizable. However, by the use of fuzzy logic, the two entries on the look up table can be compared and the stand alone device may correctly deduce that the two short signals are more likely to be the second distinctive ring and less likely to be the first distinctive ring. In embodiments, the DSP filtering function is carried out internally within microprocessor 42. Thus block 44c may be a sub-block of microprocessor 42.

The fax tone detector 44a detects a fax tone when the self-contained device 10 is in a mode to detect the fax tone. A typical example of the fax tone detector 44a is LM567 (National Semiconductor) or NJM567 (New Japan Radio). Note that in other embodiments, the device does not have fax tone detector 44a. For example, a basic embodiment may be marketed without fax tone detector 44a, without a jack to plug a fax machine into, and without ancillary equipment and programming necessary to utilize such capabilities.

The call waiting tone detector 44b is a tone detector with switched capacitor or digital signal processing (DSP) detection that detects a call-waiting tone and also discriminates between the call-waiting tone and modem noise present at that time. The call waiting tone detector 44b has selectable frequencies for different tones in other countries. A typical example of the call waiting tone detector 44b is Teltone M982-02.

The self-contained device 10 further comprises telephone line isolation and input amplification and filtration 45. The telephone line isolation and input amplification and filtration 45 are contained in the single housing 20 and communicate with, and between, the tone detectors 44 and the telephone line jack 36.

The self-contained device 10 further comprises a tone select 46. The tone select 46 is contained in the single housing 20 and communicates with the tone detectors 44.

In embodiments, the self-contained device 10 may further comprise a display and ring buzzer 48. The display and ring buzzer 48 are contained in the single housing 20 and communicate with the micro-processor 42. The micro-processor 42 generates tone for the display and ring buzzer 48.

The self-contained device 10 further comprises a ring voltage generator 50. The ring voltage generator 50 is contained in the single housing 20 and communicates with, and between, the display ring buzzer 48 and the facsimile jack 30.

The jacks 30, 32, 34, and 36 are operatively connected so as to allow transmission of analog or digital information therebetween, thus allowing transmission of such information/data between the telephone line 12 and the various devices attached to the self-contained device 10. In particular, it will be seen that telephone 14 is thus operatively connected to the device so as to allow transmission of DTMF codes and/or "flash" signals from the telephone to the device. Micro-processor 42, which is operatively connected to command filter 44c, is further able to direct incoming calls by means of the jacks 30, 32, 34, and 36 to such attached devices. Finally, micro-processor 42 and/or filter 44c is/are able to control the operation of display/buzzer 48. Ring volume, ring tone, duration, and other operations may be altered by micro-processor 42.

Figure 3:
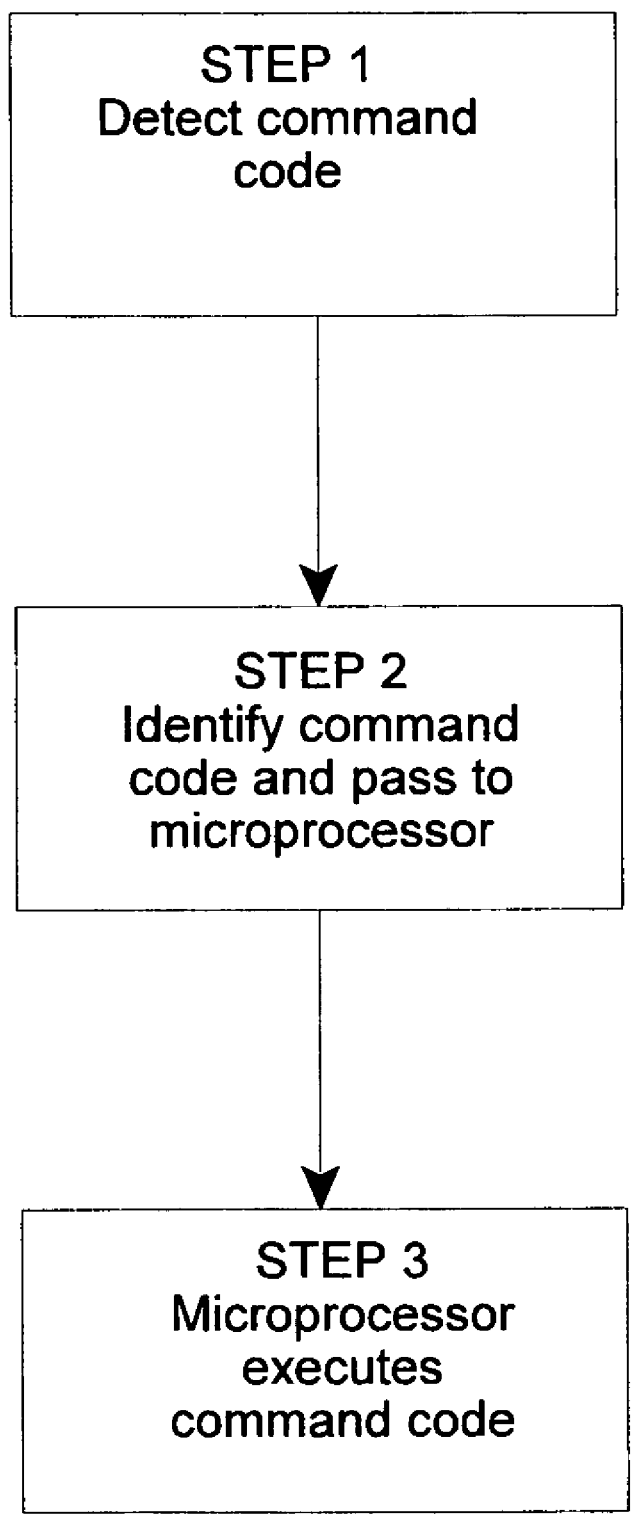
FIG. 3 is a flow chart of the method of identifying command codes during operation of the present invention.
Figure 4A:
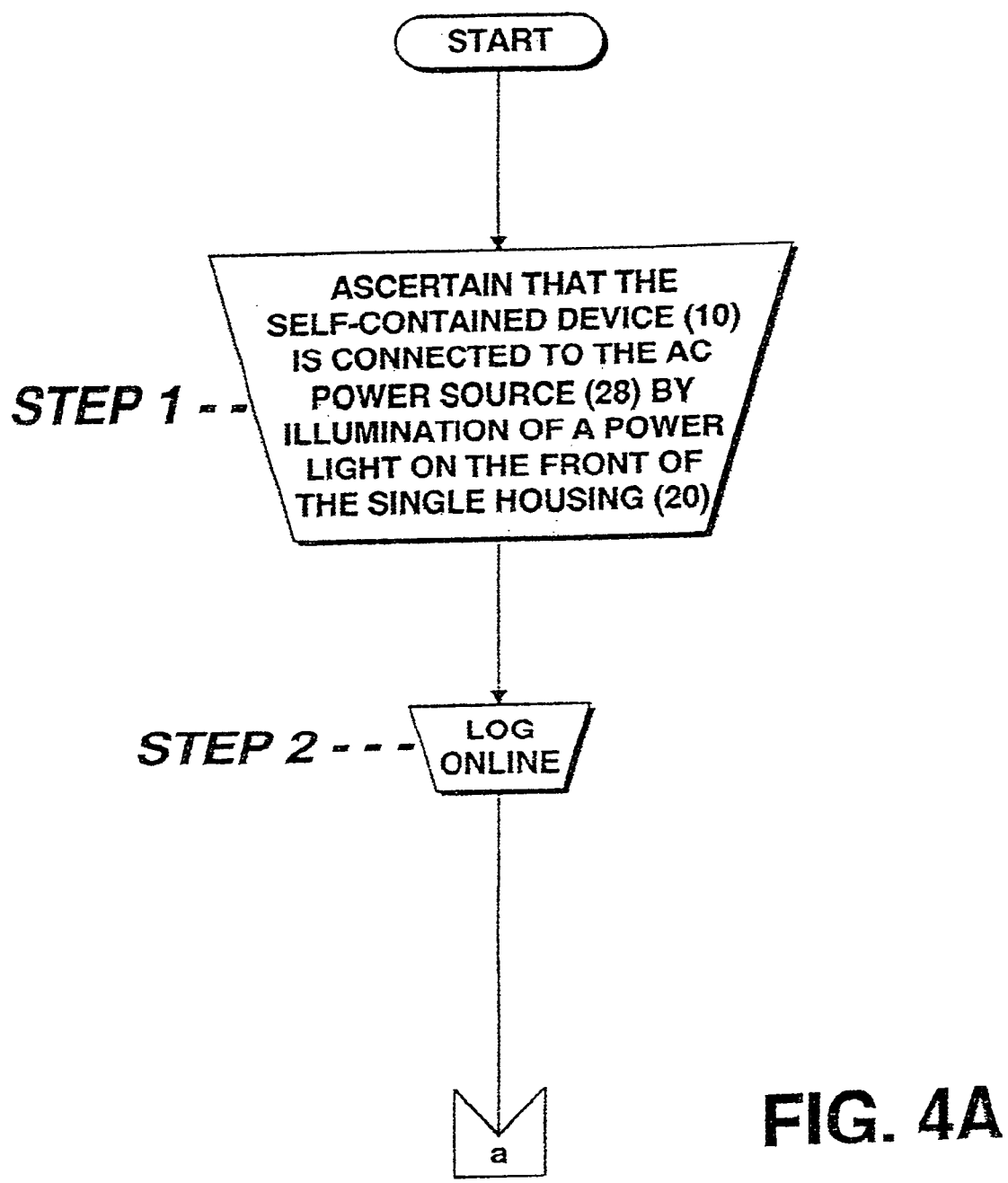
FIGS. 4A, 4B, 5 and 6 are a flow chart of the overall method of operation of the present invention, during which identification of distinctive rings according to FIG. 3 occurs.
Figure 4B:
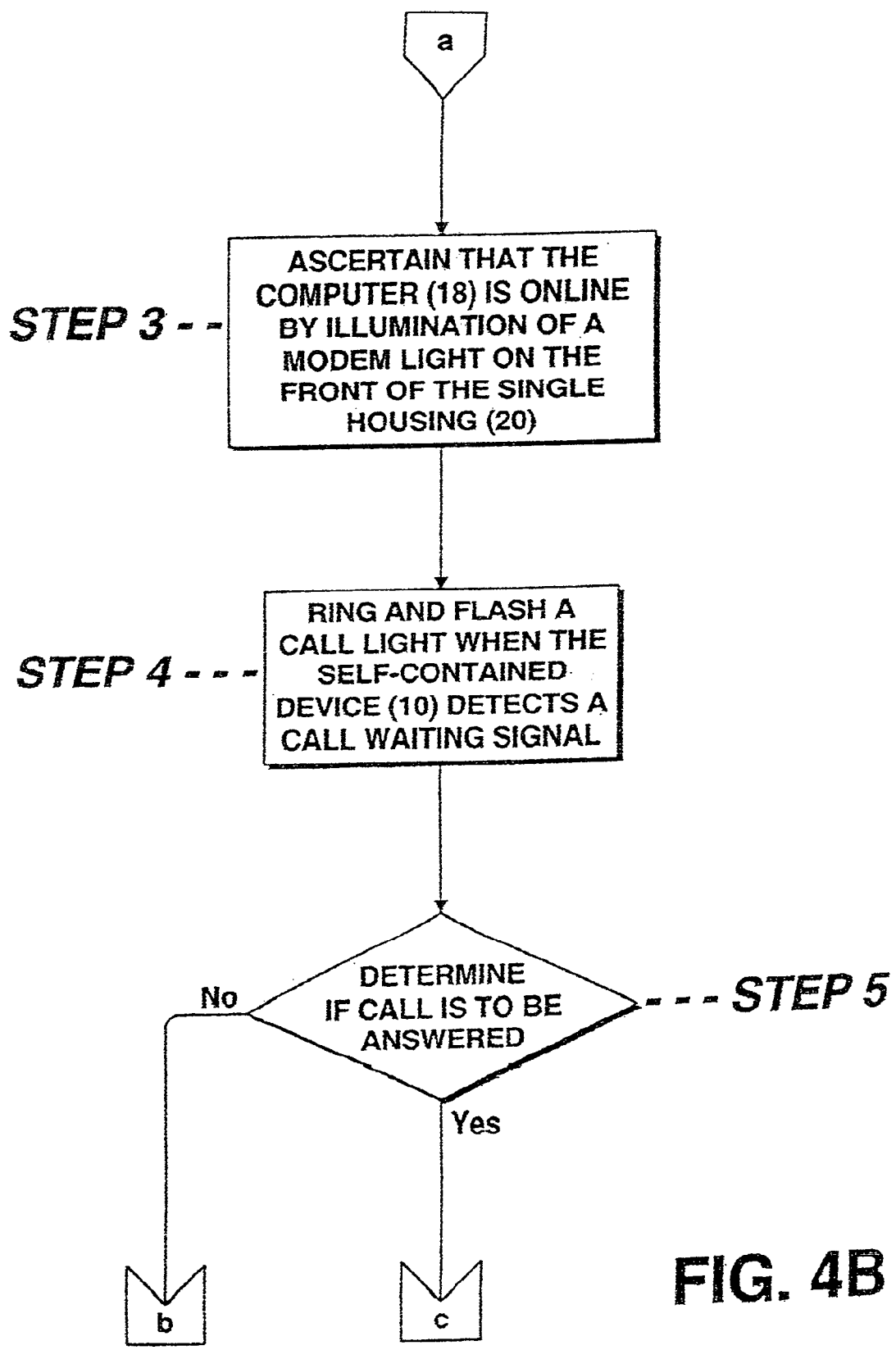
Figure 5:
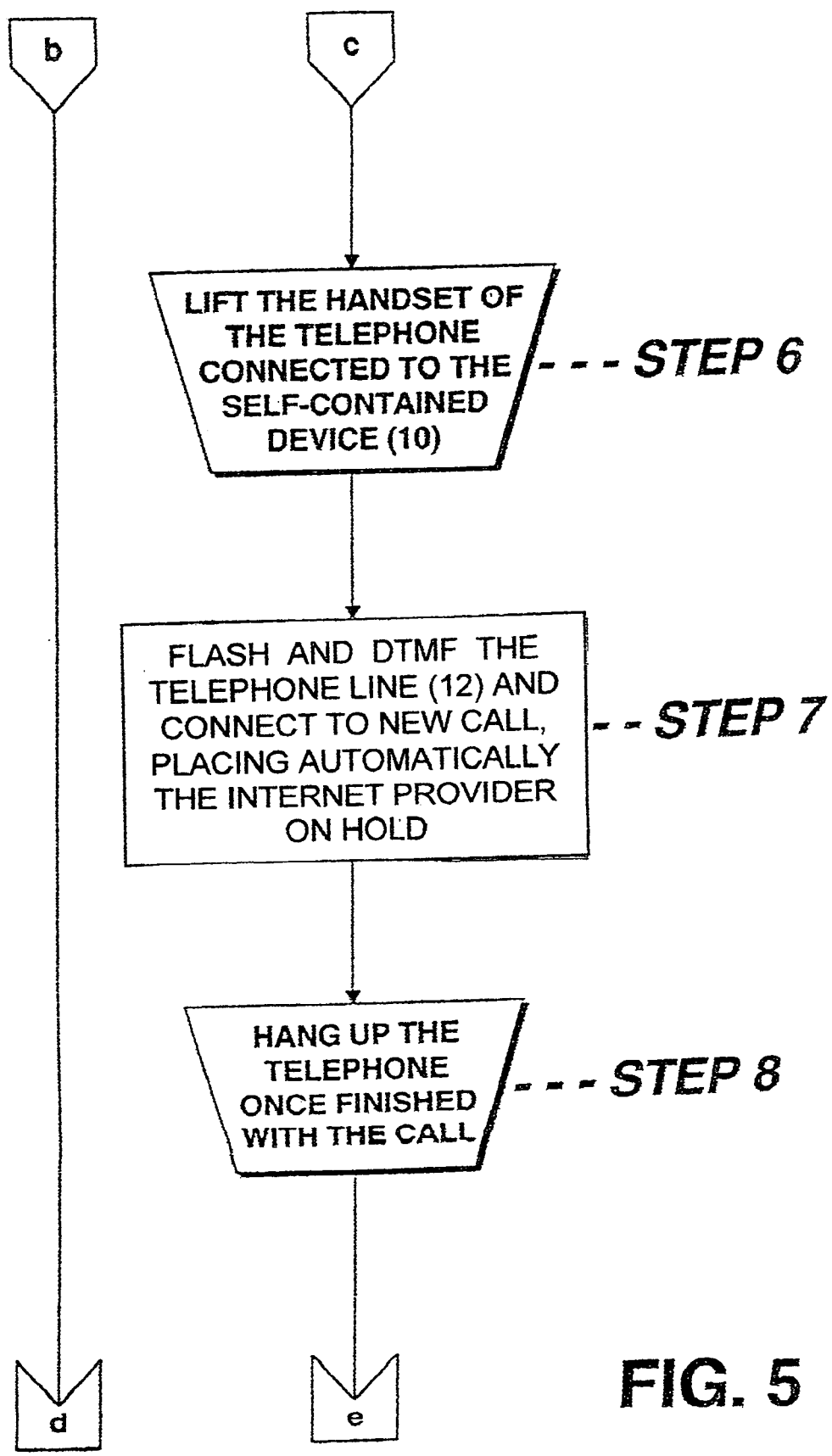
Figure 6:
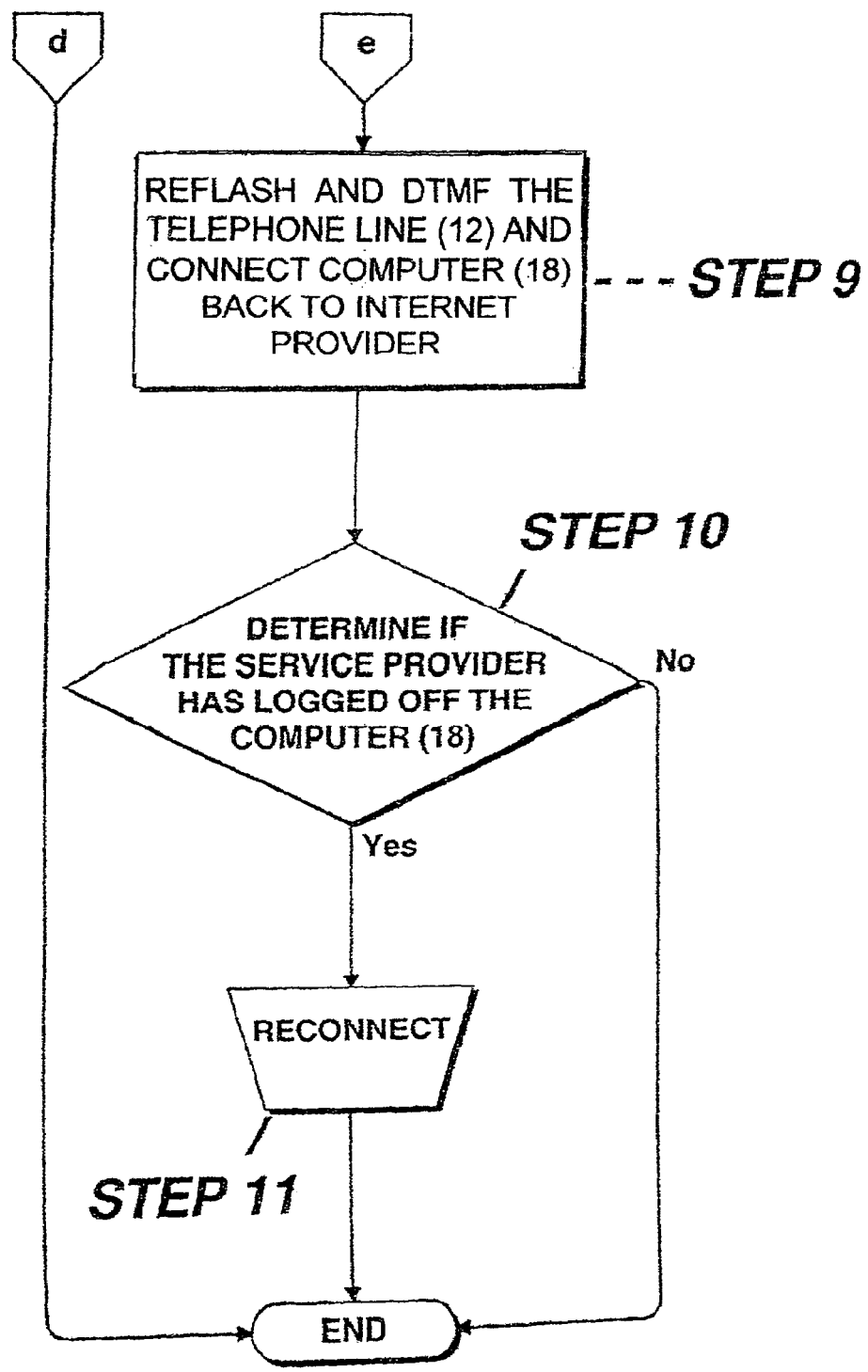
Figure 7A:
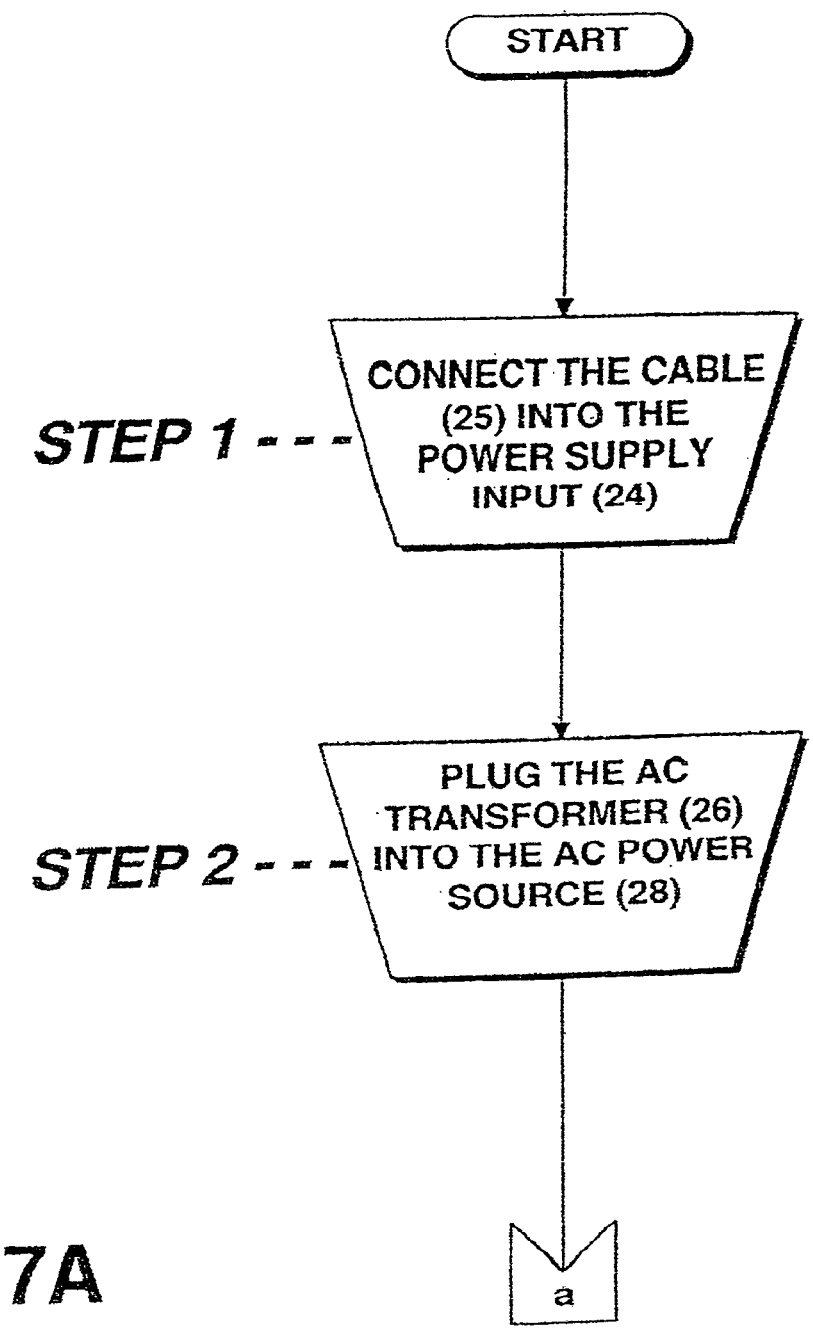
FIGS. 7A–7D are a flow chart of the method of installing the present invention.
Figure 7B:
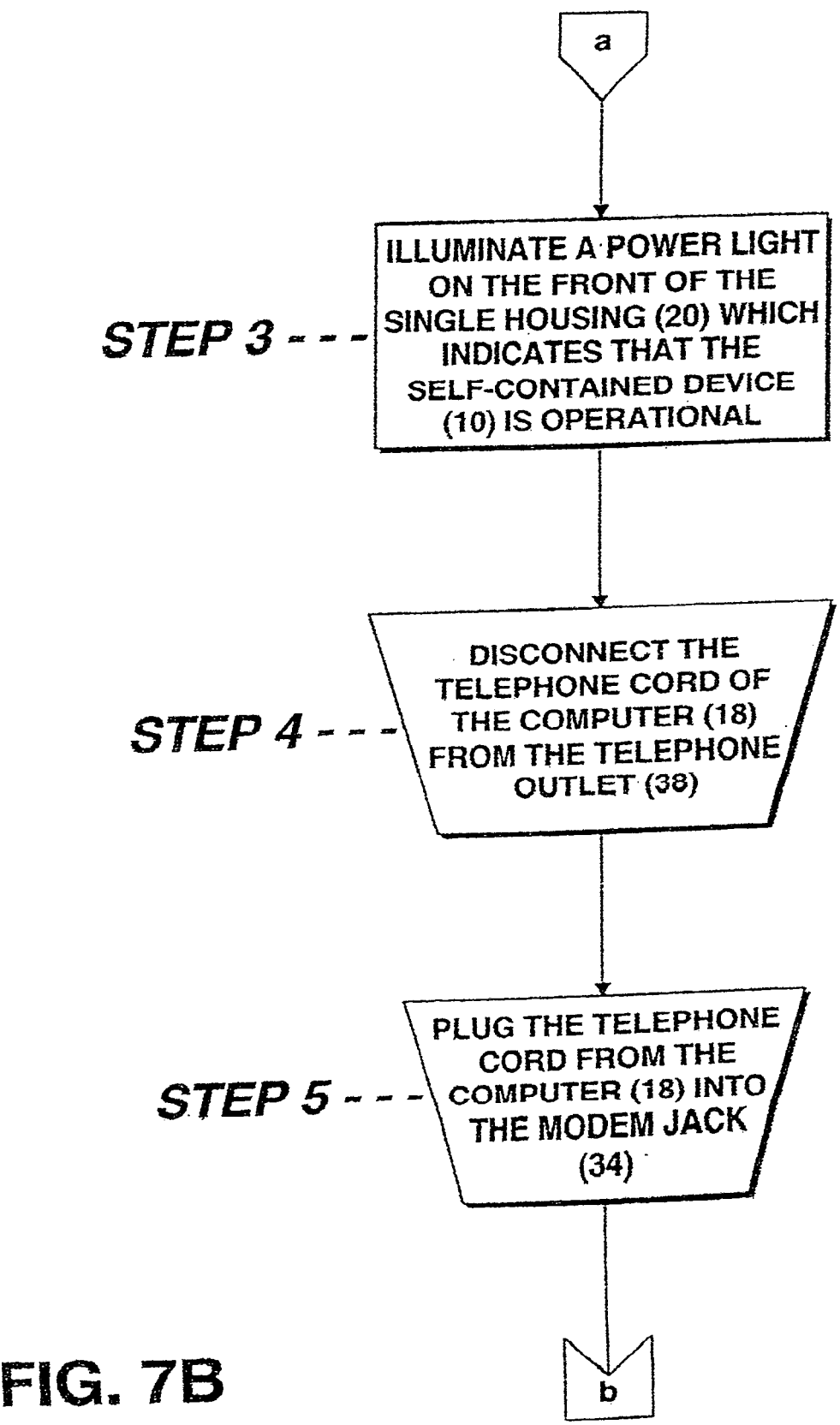
Figure 7C:
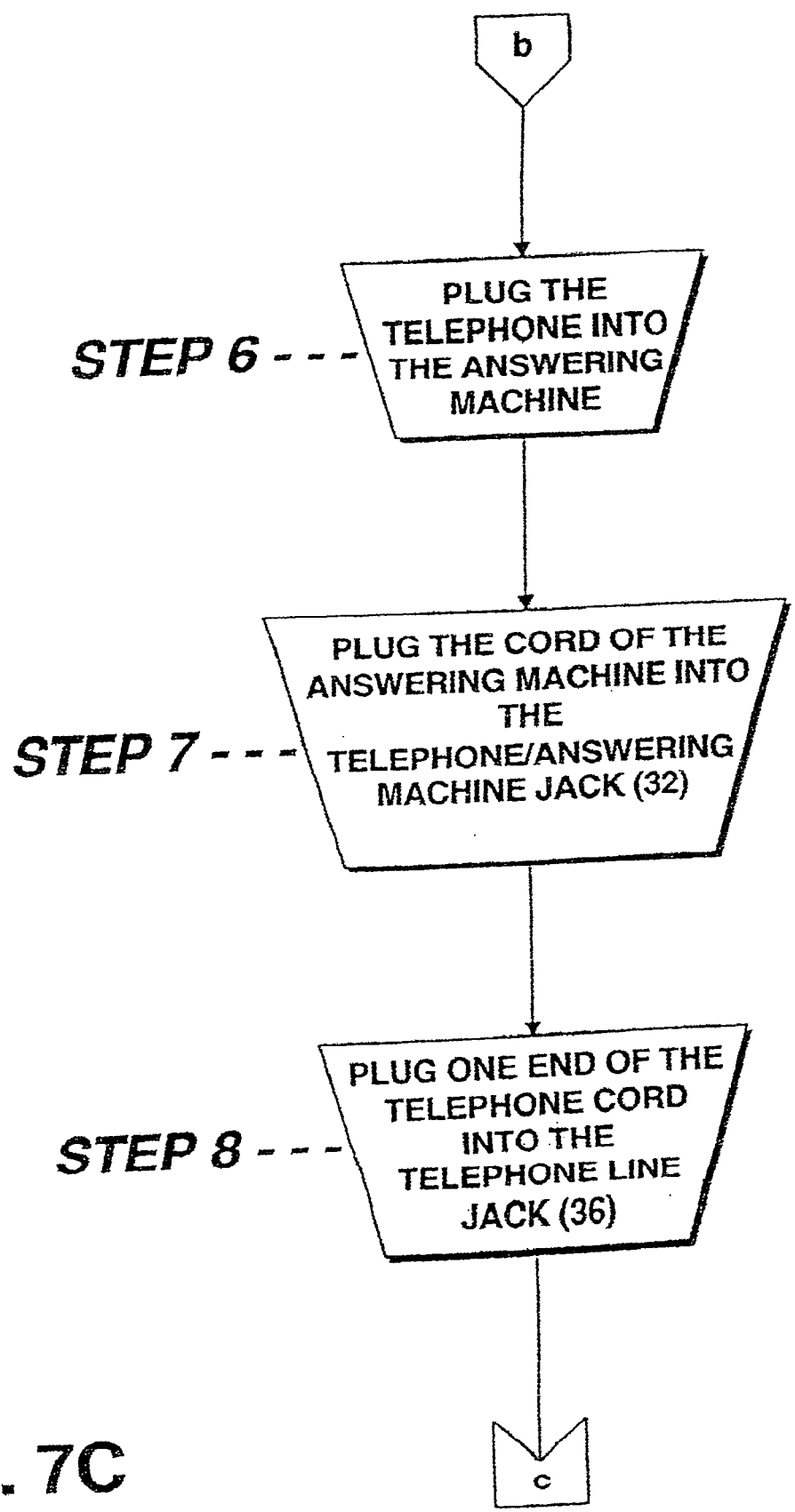
Figure 7D:
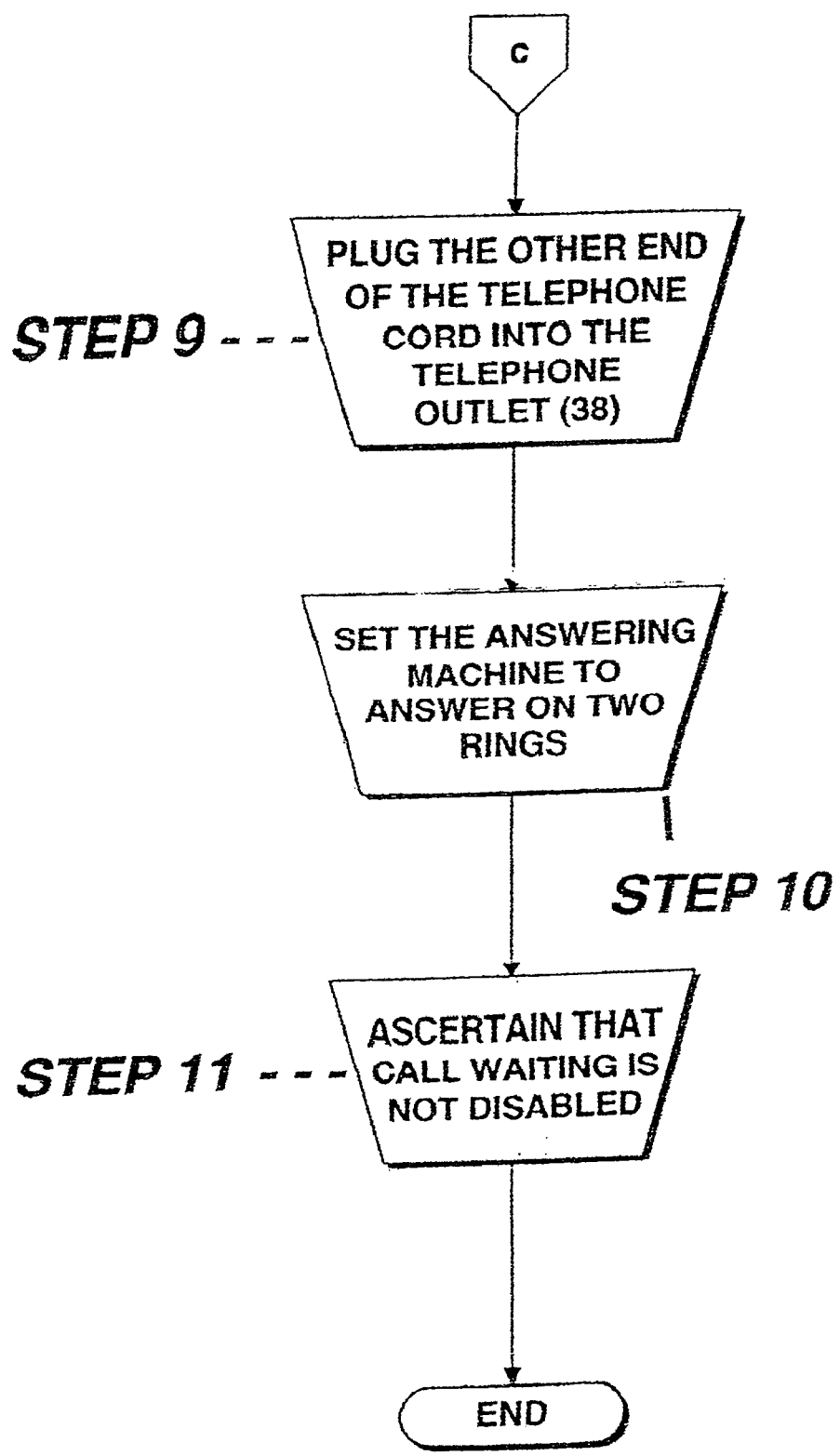

Referring now to FIG. 3, the method of use of command codes will now be discussed. The steps in this process are as follows:

STEP 1: Action is initiated when self-contained device 10 detects a command code.

STEP 2: Filter 44c then identifies the specific command code and passes it to microprocessor 42.

STEP 3: Microprocessor 42 thereafter alters the set-up, operations or programming of the device based upon the command code or codes received.

This basic process may be employed in any of the embodiments of the invention discussed below.

In the preferred embodiment and best mode now contemplated for carrying out the invention, a number of stand alone individual command codes are used. All, some or at least one of the command codes operates independently of any other command code. Each command code is received from an external source (the local telephone, a remote location, a computer or modem sending DTMF codes, the telephone network, etc) and processed in isolation of any other command code. However, in an alternative embodiment, a single primary command code may be used to cause the unit to enter a "programming mode". Thereafter, command codes which would ordinarily be processed as numbers or other data will be handled by the unit.

In the first (preferred embodiment) the following numeric codes (or more accurately the corresponding sequences of DTMF codes) are entered, filtered and used by the device:

1
2
3
*1
*2
*3
*#1

*#2

*#3

It will instantly be appreciated that the invention is by no means limited to this particular set of codes. Combinations of the keys present on a telephone keypad can produce a much larger number of combinations. In addition, it is conceivable that the device could rely upon those DTMF codes which are not represented by buttons on a telephone keypad. Thus a great number of embodiments of the invention may be contemplated using a wide range of command codes.

In use, the ##*1 command code might indicate to the processor that the volume of the device's audio signal mechanism was to be increased. If the volume was to be further increased, the user might enter the same command several times in a row. Other command codes, obviously, control other aspects of operations, set-up and programming: ring tone, ring volume, sensitivity of the unit, call routing features, call handling features (either or both based upon Caller ID, Distinctive Ring or other services).

In the other group of embodiments of the invention, a first command code (for example ###123) might be used to place the unit in a "command mode" in which further commands could be entered. At least one of the command codes causes the device to enter a command mode in which it responds to later received DTMF codes as command codes, until such time as the device leaves command mode. By this means, shorter sequences of DTMF tones might be used: a single key for instance. Being in "command mode" the device would know that these signals should be treated as codes, not as call information. This would further allow the unit to send an audio menu to the user at the speaker of the telephone terminal from which the command codes are being sent. Such an audio menu might for example state, "Press one to adjust ring volume, two to adjust unit sensitivity."

One of the command codes may comprise a security code. This is particularly useful in terms of remote operation, where security is desirable.

14. The device of claim 1, wherein at least one of the command codes operates independently of any other command code.

Thus the device is susceptible to numerous alternations in this regard, without departing from the scope of the invention.

It will be seen that filter 44c may be implemented in software or other programming of microprocessor 42. By this means, the device could be manufactured and sold without any physical alteration of the device hardware. On the other hand, filter 44c may be implemented as hardware, offering advantages (such as faster response) under other circumstances.

In a hardware implementation, filter 44c may use DTMF tone detector 44 or it may use an external tone detector; this embodiment will occur in devices which do not have an internal tone detector of their own.

In one distinctive ring embodiment presently contemplated for carrying out the invention, microprocessor 42 will display using display 48 the distinctive ring signal.

Referring now to FIGS. 4A, 4B, 5 and 6, the method of use of the device will now be discussed.

STEP 1: Ascertain that the self-contained device 10 is connected to the AC power source 28 by illumination of a power light on the front of the single housing 20.

STEP 2: Log online.

STEP 3: Ascertain that the computer 18 is online by illumination of a modem light on the front of the single housing 20.

STEP 4: Ring and flash a call light when the self-contained device 10 detects a call waiting signal.

STEP 5: Determine if call is to be answered.

STEP 6: Lift the handset of the telephone connected to the self-contained device 10, if answer to STEP 5 is yes.

STEP 7: Flash automatically the telephone line 12 and connect to the caller, placing automatically the Internet provider on hold.

STEP 8: Hang up the telephone once finished with the call.

STEP 9: Reflash automatically the telephone line 12 and connect the computer 18 back to the Internet provider.

STEP 10: Determine if the service provider has logged off the computer 18. It is not unusual for the Internet service provider to disconnect within a short period.

STEP 11: Reconnect, if answer to STEP 10 is yes.

The method of installing the self-contained device 10 can best be seen in FIGS. 7A–7E, and as such, will be discussed with reference thereto.

STEP 1: Connect the cable 25 into the power supply input 24.

STEP 2: Plug the AC transformer 26 into the AC power source 28.

STEP 3: Illuminate a power light on the front of the single housing 20, which indicates that the self-contained device 10 is operational.

STEP 4: Disconnect the telephone cord of the computer 18 from the telephone outlet 38.

STEP 5: Plug the telephone cord from the computer 18 into the modem jack 34.

STEP 6: Plug the telephone into the answering machine.

STEP 7: Plug the cord of the answering machine into the telephone/answering machine jack 32.

STEP 8: Plug one end of the telephone cord into the telephone line jack 36.

STEP 9: Plug the other end of the telephone cord into the telephone outlet 38.

STEP 10: Determine if the self-contained device 10 is being used with a facsimile machine 16.

STEP 11: Plug the facsimile cord into the facsimile jack 30. if answer to STEP 10 is yes.

STEP 12: Set the facsimile machine 16 to answer automatically and proceed to STEP 14, if STEP 11 is carried out. The facsimile machine 16 will only respond to an incoming call when the self-contained device 10 transfers the incoming call to the facsimile machine 16. The facsimile machine 16 will no longer answer when the telephone rings.

STEP 13: Proceed to step 14, if answer to STEP 10 is no.

STEP 14: Set the answering machine to answer on two rings.

STEP 15: Ascertain that call waiting is not disabled.

Figure 8A:
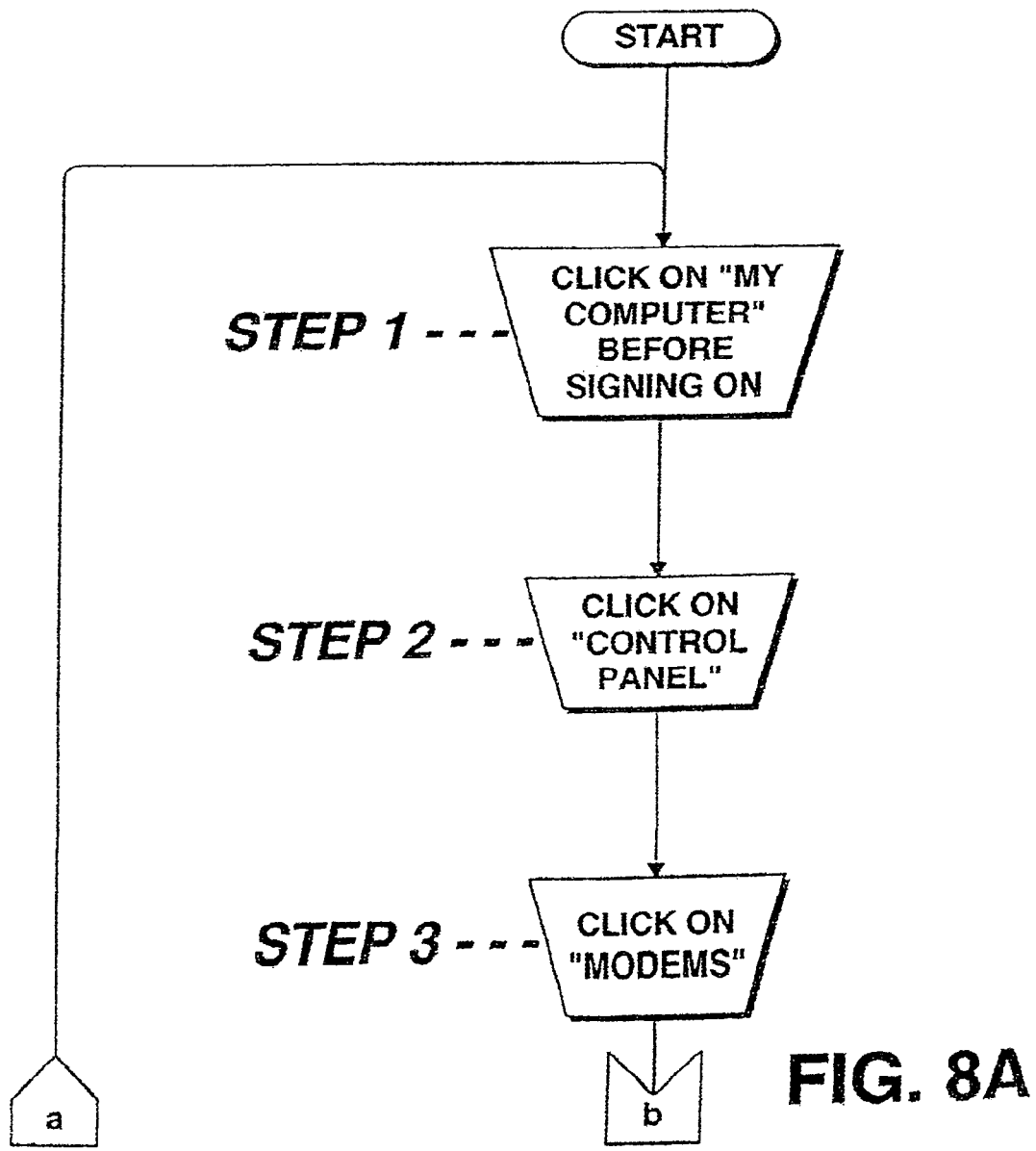
FIGS. 8A–8C are a flow chart of the method of ascertaining that call waiting is not disabled for window users.
Figure 8B:
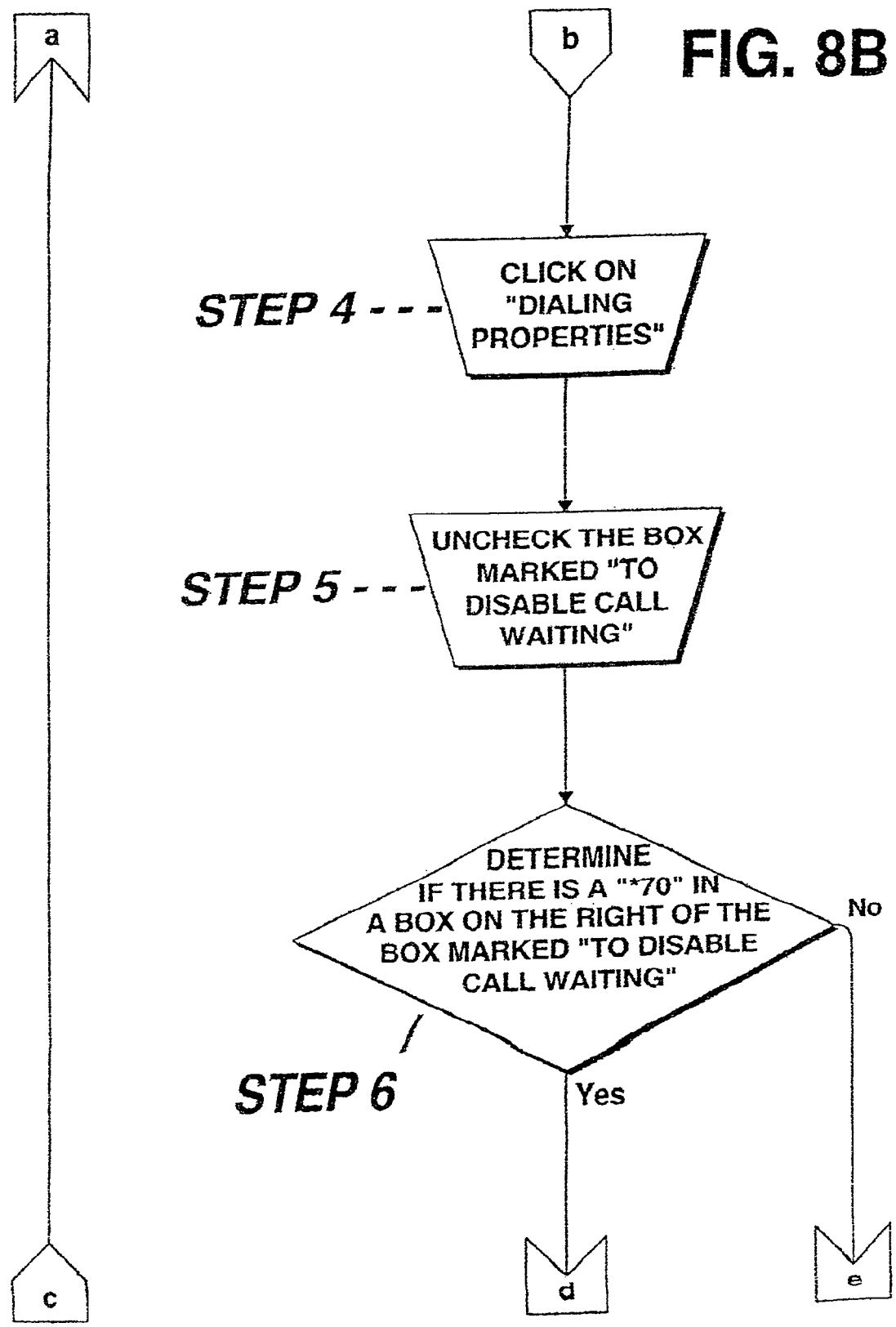
Figure 8C:
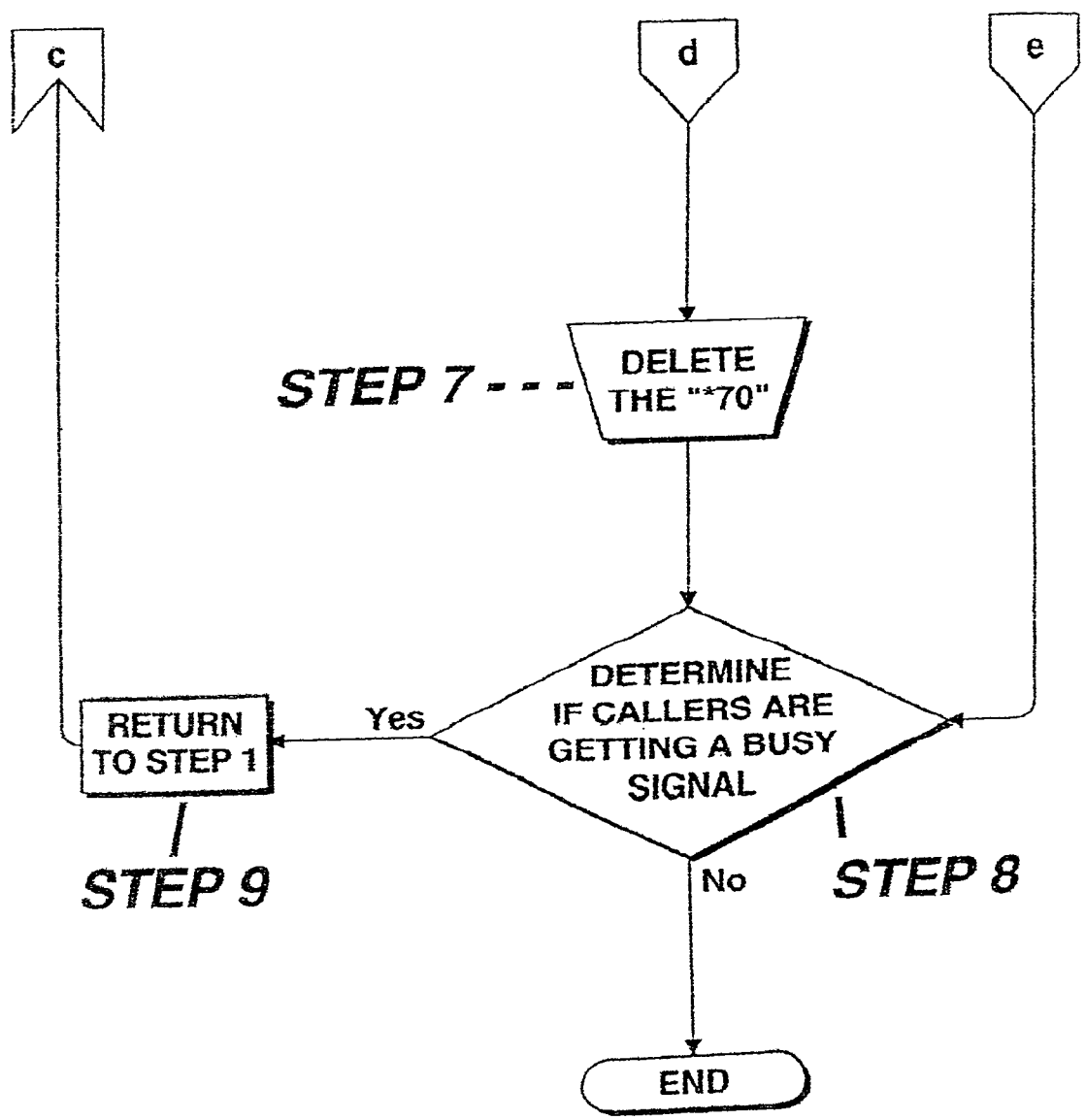

The method of ascertaining that call waiting is not disabled for window users can best be seen in FIGS. 8A–8C, and as such, will be discussed with reference thereto.

STEP 1: Click on "my computer" before signing on.

STEP 2: Click on "control panel".

STEP 3: Click on "modems".

STEP 4: Click on "dialing properties".

STEP 5: Uncheck the box marked "to disable call waiting".

STEP 6: Determine if there is a "*70" in a box on the right of the box marked "to disable call waiting".

STEP 7: Delete the "*70", if answer to STEP 6 is yes. There may also be a telephone icon on the control panel with the same check box.

STEP 8: Determine if callers are getting a busy signal.
STEP 9: Return to STEP 1, if answer to STEP 8 is yes.

Figure 9A:
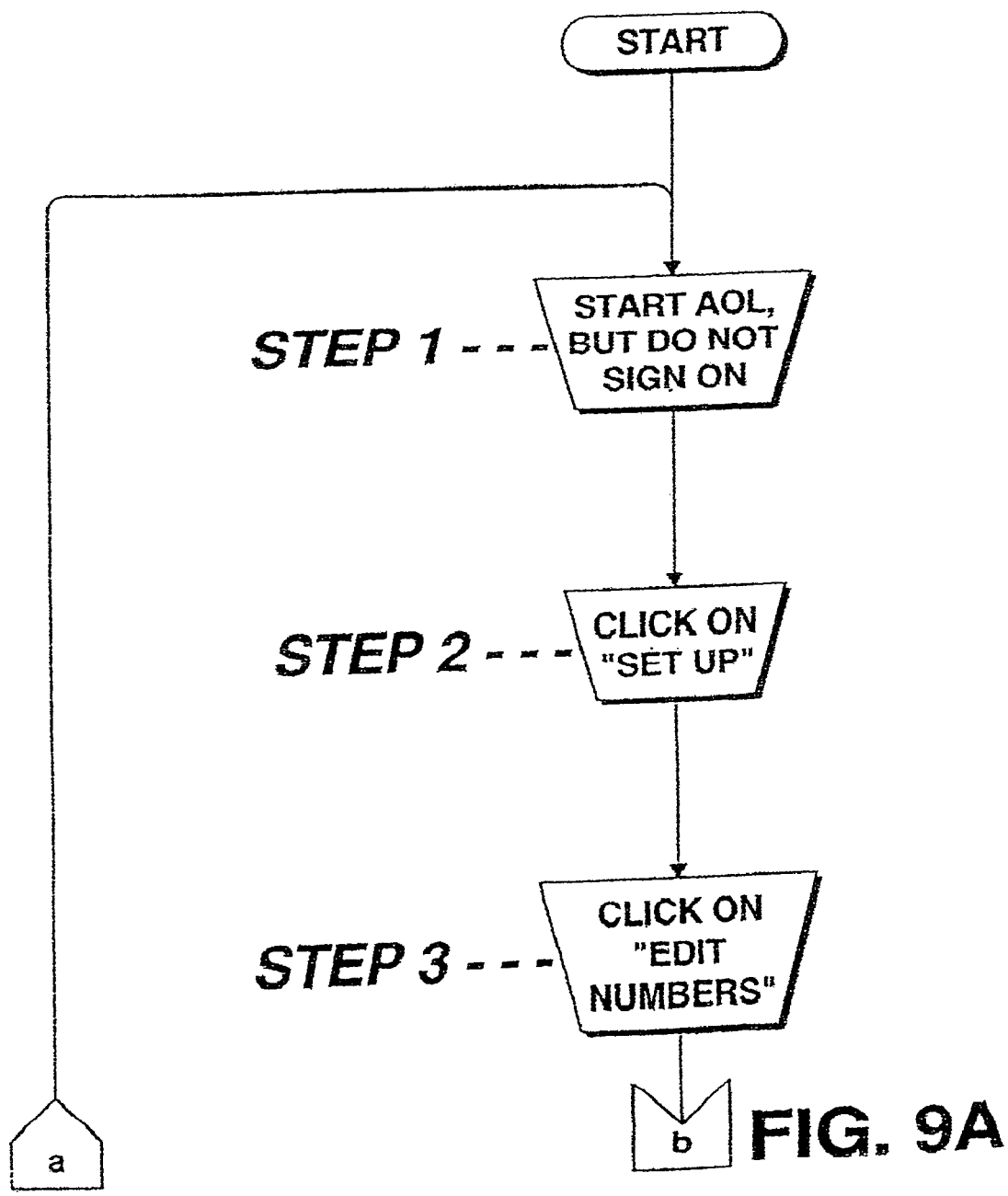
FIGS. 9A–9B are a flow chart of the method of ascertaining that calling waiting is not disabled for America-On-Line (AOL) users.
Figure 9B:
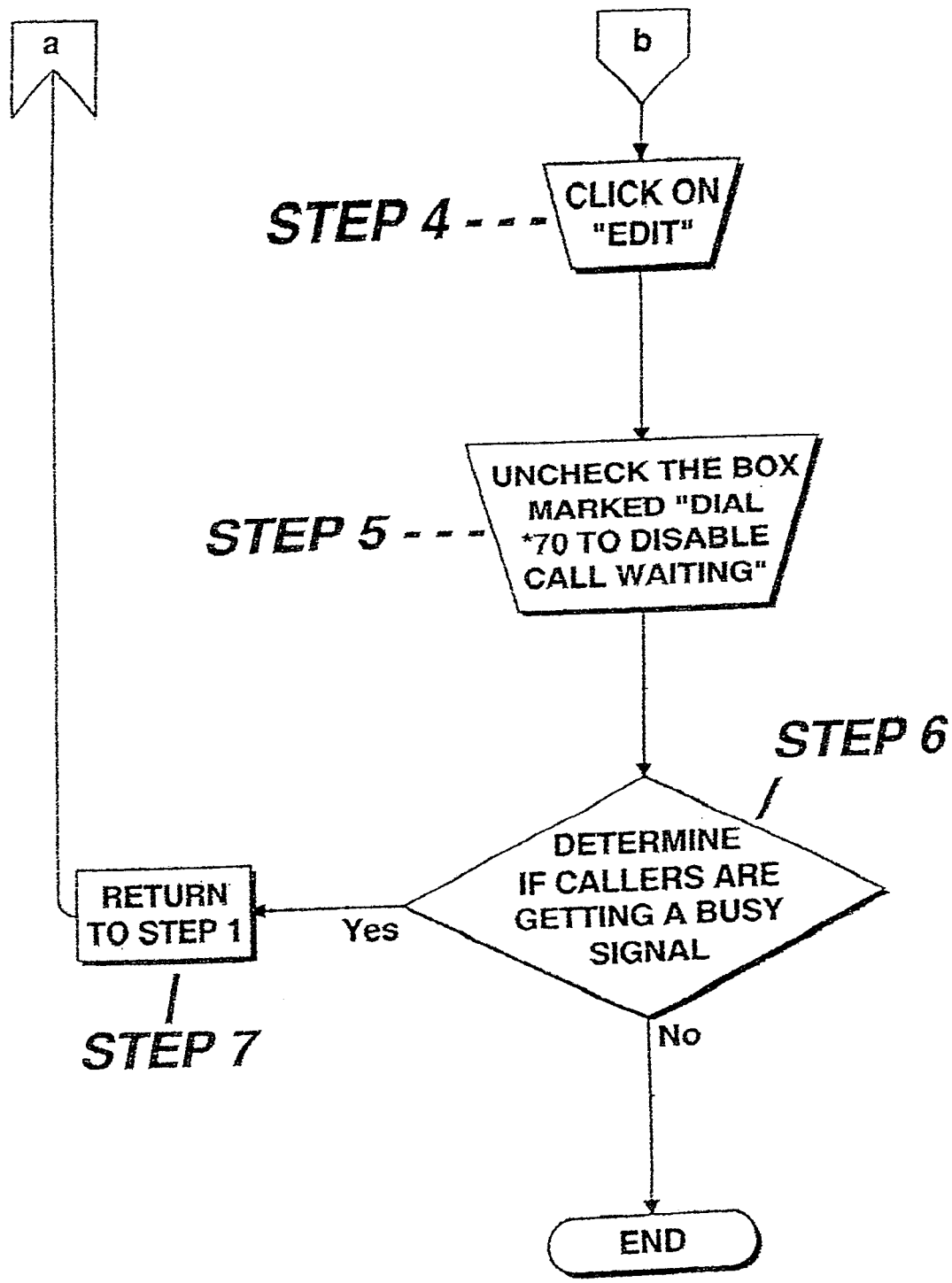

The method of ascertaining that calling waiting is not disabled for AOL users can best be seen in FIGS. 9A–9B, and as such, will be discussed with reference thereto.

STEP 1: Start AOL, but do not sign on.
STEP 2: Click on "set up".
STEP 3: Click on "edit numbers".
STEP 4: Click on "edit".
STEP 5: Uncheck the box marked "dial *70 to disable call waiting".
STEP 6: Determine if callers are getting a busy signal.
STEP 7: Return to STEP 1, if answer to STEP 6 is yes.

Figure 10A:
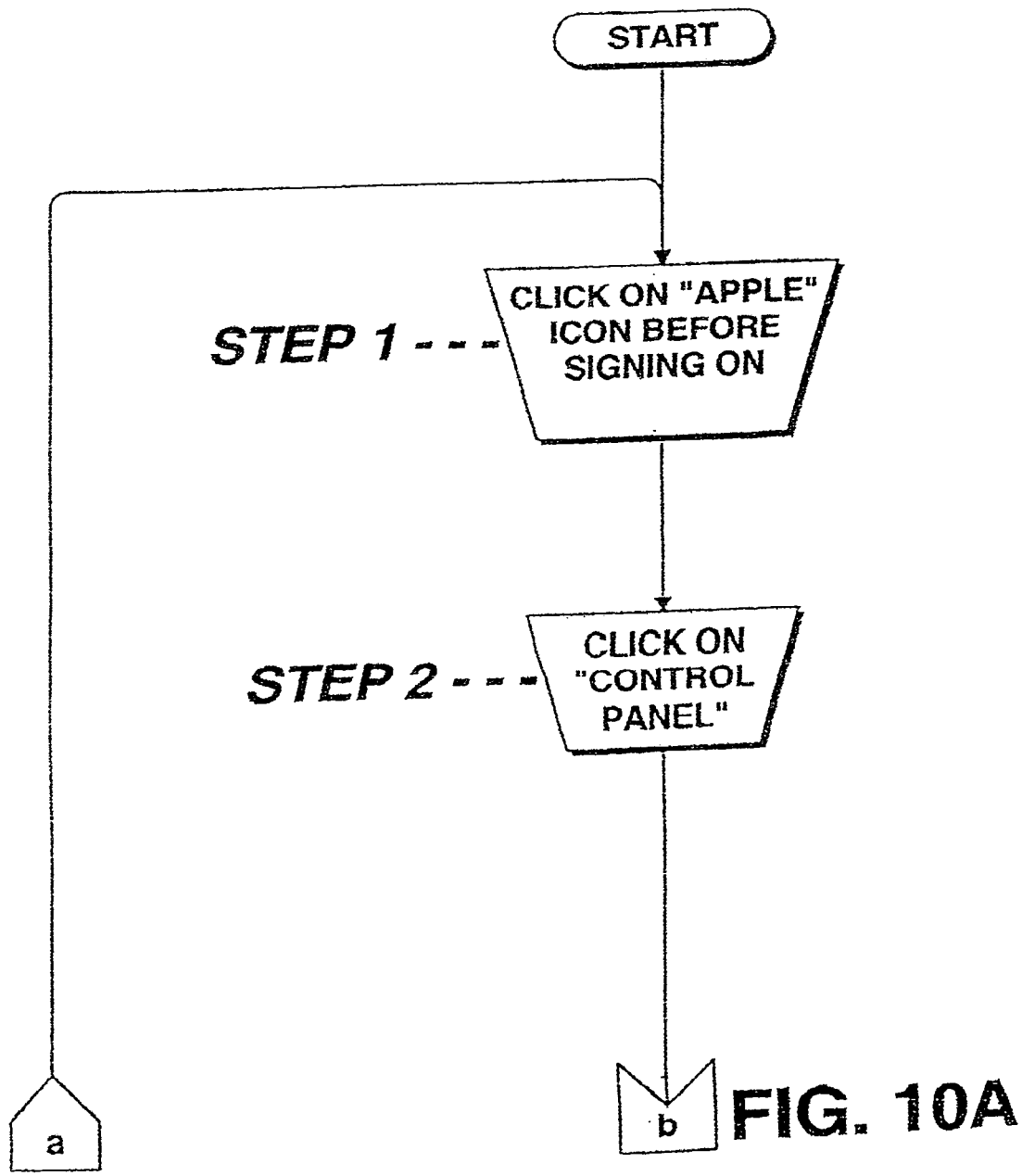
FIGS. 10A–10B are a flow chart of the method for ascertaining that call waiting is not disabled for Macintosh Computer (MAC) users.
Figure 10B:
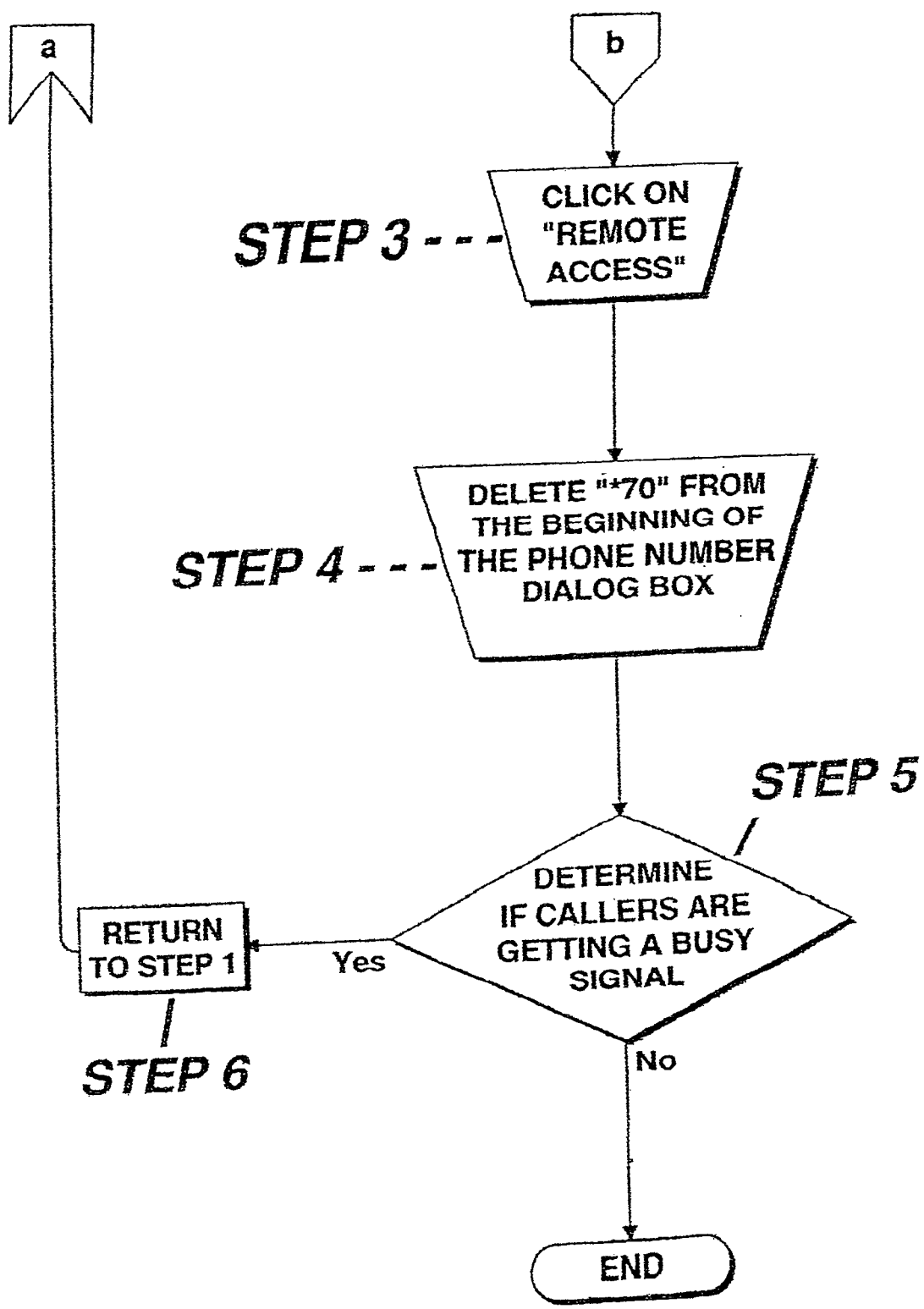
Figure 11A:
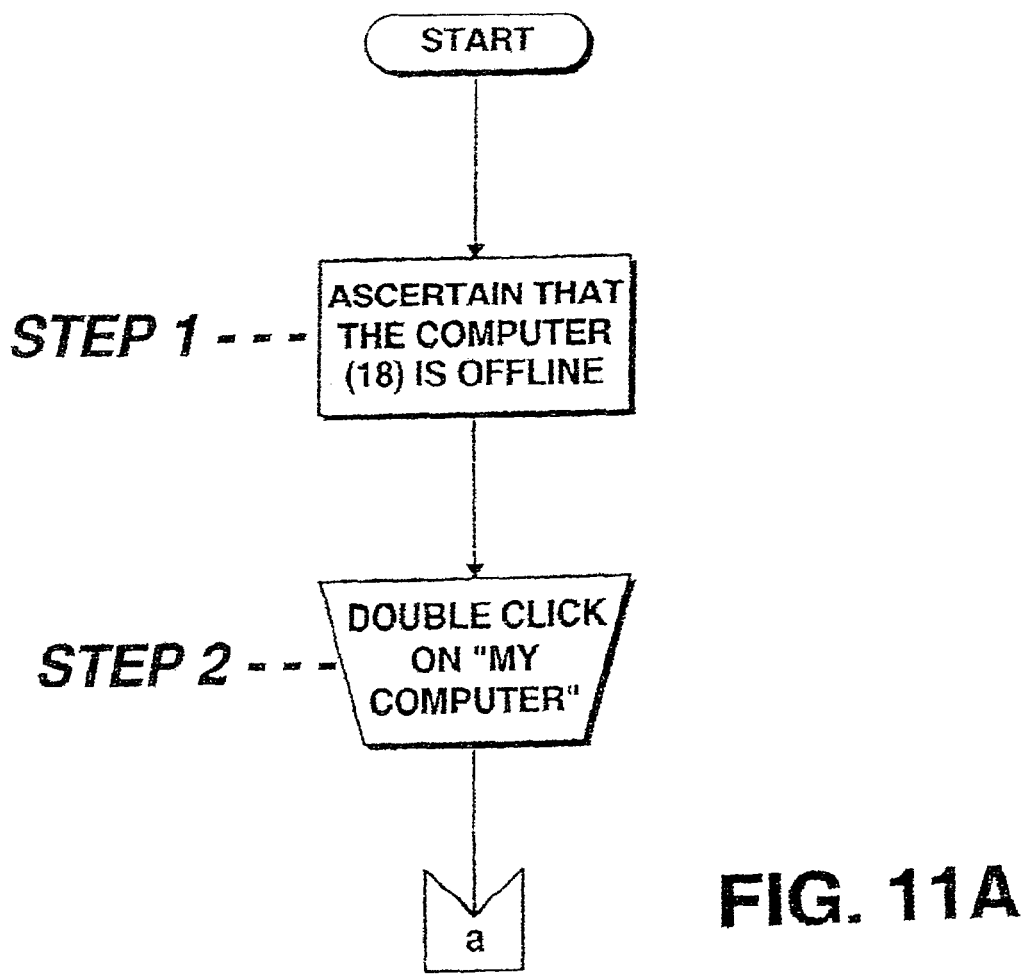
FIGS. 11A–11D are a flow chart of the method of making the present invention work better with the computer if the computer disconnects as soon as the telephone/answering machine rings or as soon as the telephone/answering machine is answered.
Figure 11B:
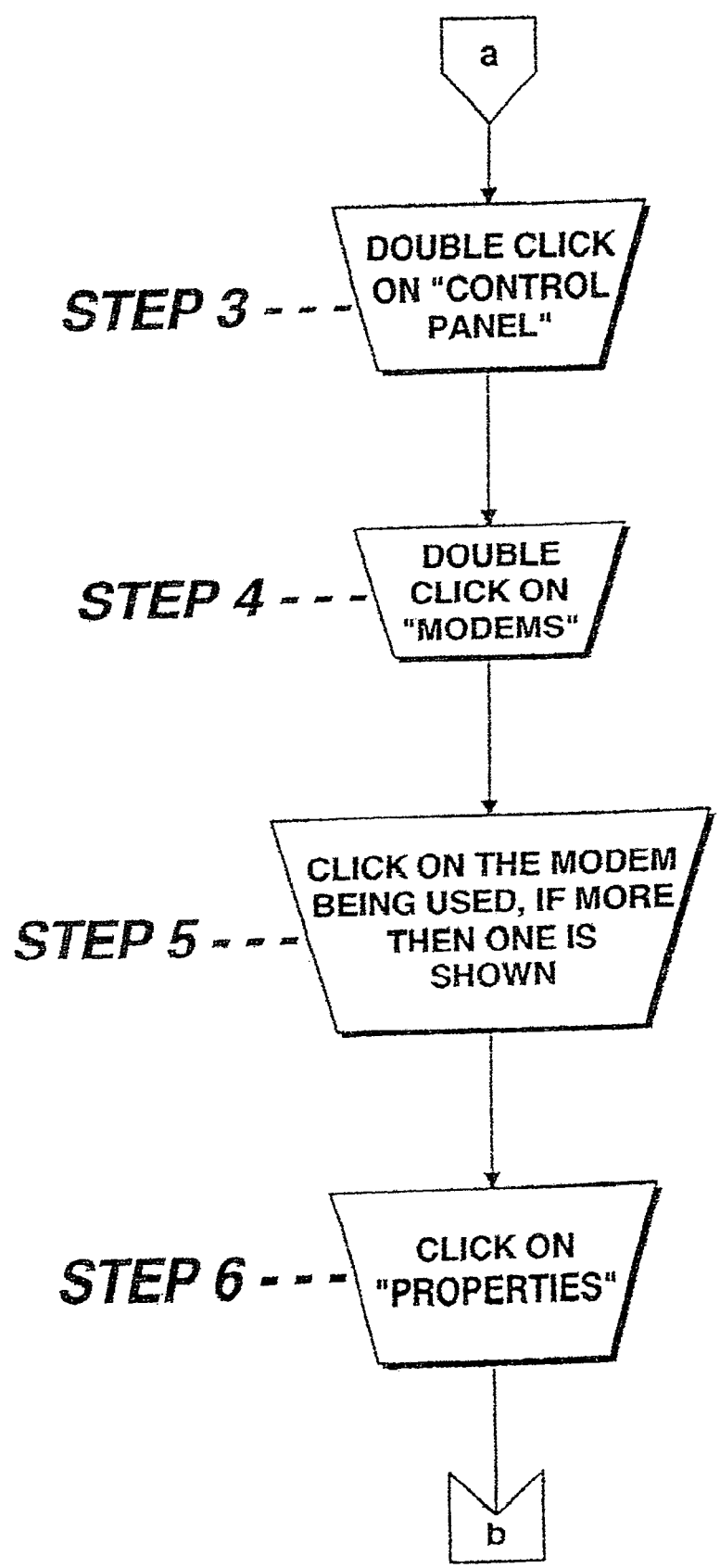
Figure 11C:
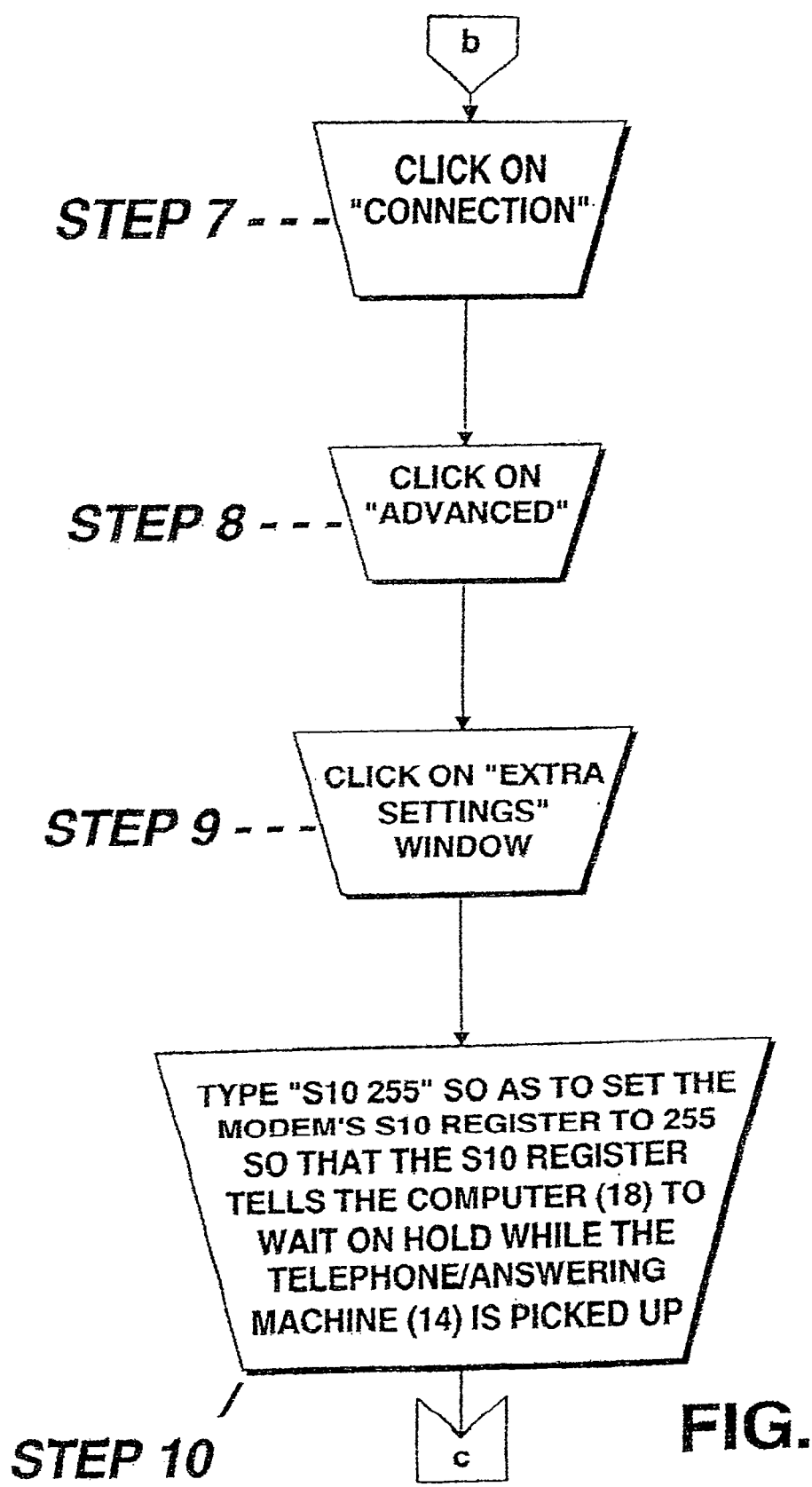
Figure 11D:
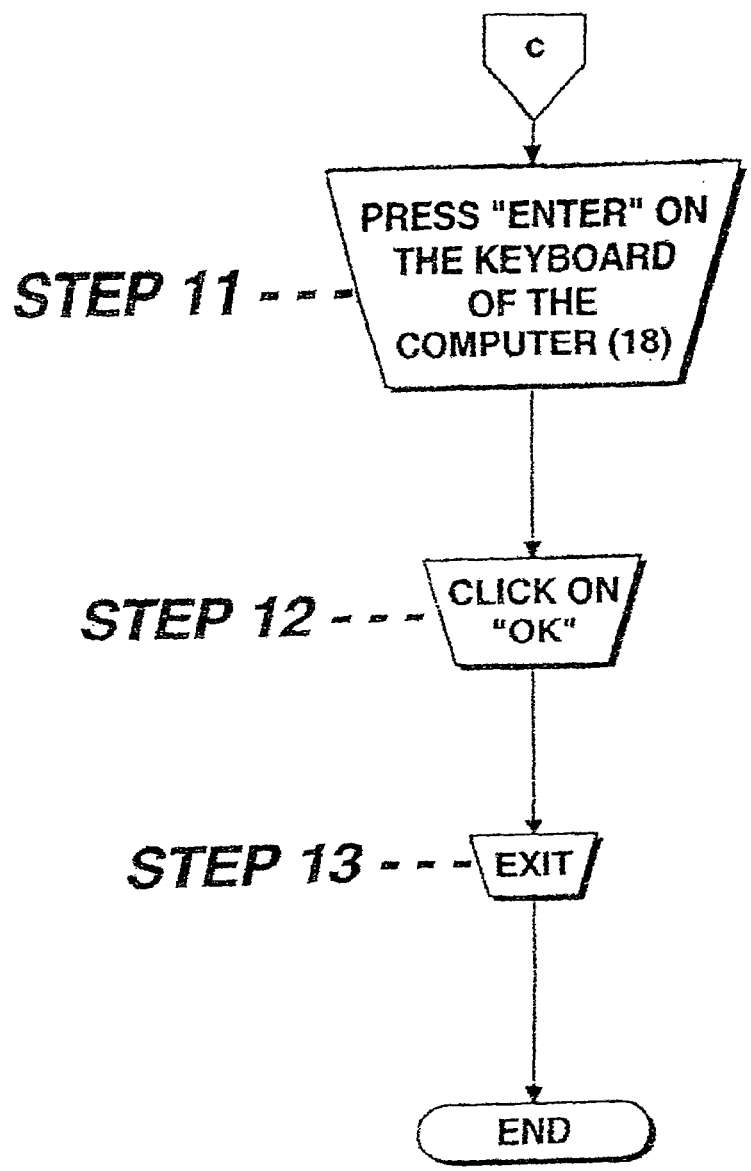

The method for ascertaining that call waiting is not disabled for MAC users can best be seen in FIGS. 10A–10B, and as such, will be discussed with reference thereto.

STEP 1: Click on the apple icon before signing on.
STEP 2: Click on "control panel".
STEP 3: Click on "remote access".
STEP 4: Delete "*70" from the beginning of the phone number dialog box.
STEP 5: Determine if callers are getting a busy signal.
STEP 6: Return to STEP 1, if answer to STEP 5 is yes.

The method of making the self-contained device 10 work better with the computer 18 if the computer 18 disconnects as soon as the telephone/answering machine 14 rings or as soon as the telephone/answering machine 14 is answered can best be seen in FIGS. 11A–11D, and as such, will be discussed with reference thereto.

STEP 1: Ascertain that the computer 18 is offline.
STEP 2: Double click on "my computer".
STEP 3: Double click on "control panel".
STEP 4: Double click on "modems".
STEP 5: Click on the modem being used, if more then one is shown.
STEP 6: Click on "properties".
STEP 7: Click on "connection".
STEP 8: Click on "advanced".
STEP 9: Click on "extra settings" window.
STEP 10: Type "S10 255" so as to set the modems S10 register to 255 so that the S10 register tells the computer 18 to wait on hold while the telephone/answering machine 14 is picked up.
STEP 11: Press "enter" on the keyboard of the computer 18.
STEP 12: Click on "OK".
STEP 13: Exit.

During set-up of certain alternative embodiments of the invention, the user may in addition wish to direct the invention as to handling of incoming calls based upon recipient identity. Thus, the "Internet suspension" operation, STEP 7 of FIG. 4 may be enabled in certain cases and not in others, while the set-up operations of the self-contained device 10 may direct the methods of ringing/flashing the buzzer/call light 38 during STEP 4 of FIG. 4. In addition, STEP 5 of FIG. 4, in which the determination as to whether a call is to be answered or not is made, may be designated automatically based upon the distinctive ring signal received.

In previous device, this additional set-up may be carried out in hardware (for example, by means of buttons on the self-contained unit 10) or may be carried out by means of software on a personal computer, with the settings generated by the personal computer then downloaded to the self-contained device 10. Note that the setting information may then be present in self-contained device 10 even when a computer is turned off, disconnected, broken or otherwise unavailable during an incoming call. This facet of the self-contained operation is felt to be a marked improvement over devices teaching use of a personal computer to handle incoming distinctive ring information.

Figure 12:
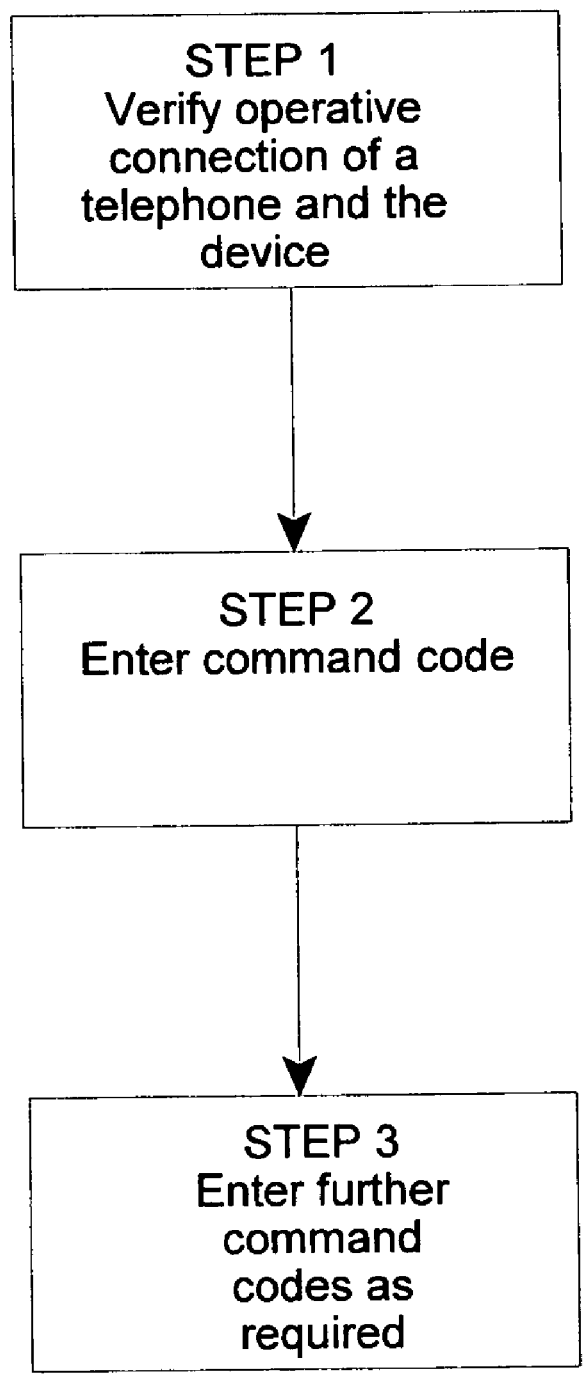
FIG. 12 is a flow chart of the method of using a telephone to alter operation of the device.

However, in the present invention, a different method of setting up the operation of the device may be employed, as illustrated in FIG. 12 and listed below.

STEP 1: Verify operative connection of a telephone and the device.
STEP 2: Enter command code.
STEP 3: Enter further command codes as required.

The phrase operative connection of a telephone and the device covers not just plugging a telephone into the device but further includes remote operation of the device from a another telephone.

In the preferred embodiment, entry of the command code occurs by means of the keypad of a telephone device, though as stated previously the invention is not so limited.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A self-contained device for using a single telephone line to receive telephone calls while being simultaneously connectable to the Internet by a computer having a modem, said device comprising:
   a) a single housing having a wall and a microprocessor;
   b) a telephone/answering machine jack located on the wall of the single housing;
   c) a modem jack located on the wall of the single housing;
   d) a telephone line jack located on the wall of the single housing;
   e) a command code filter able to identify DTMF command codes, the command code filter operatively connected to the microprocessor for controlling the configuration settings of said device in response to the receipt of said DTMF command codes.

2. The device of claim 1, wherein the DTMF command codes are generated by a telephone operatively connected to the device, the telephone having a keypad and a DTMF tone generator.

3. The device of claim 1, wherein the DTMF command codes are generated by a telephone operatively connected to the device by a physical connection to the telephone line jack, the telephone having a keypad and a DTMF tone generator.

4. The device of claim 1, wherein the DTMF command codes are generated by a telephone operatively connected to the device via a telephone switching system, the telephone having a keypad and a DTMF tone generator.

5. The device of claim 1, wherein the microprocessor is able to respond to receipt of DTMF command codes from the command code filter.

6. The device of claim 5, wherein receipt of a DTMF command code causes the microprocessor to alter one member selected from the group consisting of: operation of the switching device, set-up of the switching device, programming of the switching device, and combinations thereof.

7. The device of claim 1, wherein the sensitivity of the device to receipt of such telephone calls may be adjusted by means of a DTMF command code.

8. The device of claim 1, wherein the command code filter is a software device.

9. The device of claim 8, wherein the command code filter is implemented in the microprocessor.

10. The device of claim 1, wherein the command code filter is a hardware device.

11. The device of claim 1, wherein the command code filter utilizes one member selected from the group consisting of: digital signal processing, fuzzy logic, look-up tables, and combinations thereof, in determining what signals are received.

12. The device of claim 1, wherein at least one of the command codes comprises a security code.

13. The device of claim 1, wherein at least one of the command codes causes the device to enter a command mode in which it responds to later received DTMF codes as command codes, until such time as the device leaves command mode.

14. The device of claim 1, wherein at least one of the command codes operates independently of any other command code.

15. The device of claim 1, wherein the command code filter is external to the device and operatively connected thereto.

16. An improved method of programming a telephone switching device used to receive telephone calls while simultaneously connectable to the Internet by a computer having a modem, the improvement comprising:
   a) providing a command code filter able to identify DTMF command codes generated by an external telephone in operative connection with the switching device;
   b) using the DTMF command codes to alter one member selected from the group consisting of operation of the switching device, set-up of the switching device, programming of the switching device, and combinations thereof.

* * * * *